United States Patent
Rouillard et al.

[11] Patent Number: 6,120,930
[45] Date of Patent: *Sep. 19, 2000

[54] RECHARGEABLE THIN-FILM ELECTROCHEMICAL GENERATOR

[75] Inventors: Roger Rouillard, Beloeil, Canada; Michael K. Domroese, South St. Paul; Joseph A. Hoffman, Minneapolis, both of Minn.; David D. Lindeman, Hudson, Wis.; Joseph-Robert-Gaétan Noël, St-Hubert, Canada; Vern E. Radewald, Austin, Tex.; Michel Ranger, Lachine; Anthony Sudano, Laval, both of Canada; Jennifer L. Trice, Eagan; Thomas A. Turgeon, Fridley, both of Minn.

[73] Assignees: 3M Innovative Properties Corporation, Saint Paul, Minn.; Hydro-Quebec, Montreal, Canada

[*] Notice: This patent is subject to a terminal disclaimer.

[21] Appl. No.: 08/900,924

[22] Filed: Jul. 25, 1997

[51] Int. Cl.⁷ .......................... H01M 10/50; H01M 6/12; H01M 4/00

[52] U.S. Cl. ...................... 429/66; 429/120; 429/127; 429/153; 429/162

[58] Field of Search .................... 429/162, 127, 429/120, 153, 66, 94

[56] References Cited

U.S. PATENT DOCUMENTS

| | | |
|---|---|---|
| 2,812,376 | 11/1957 | Yardney . |
| 3,193,412 | 7/1965 | Salkind et al. . |
| 3,390,014 | 6/1968 | Eisler . |
| 3,578,506 | 5/1971 | Chassoux . |
| 3,630,783 | 12/1971 | Przybyla . |
| 3,786,466 | 1/1974 | Naito et al. . |
| 3,793,501 | 2/1974 | Stonestrom . |
| 3,899,355 | 8/1975 | Chiklis . |
| 3,937,635 | 2/1976 | Mead et al. . |
| 4,028,479 | 6/1977 | Fanciullo et al. .................. 429/152 |
| 4,060,669 | 11/1977 | Fanciullo .............................. 429/152 |
| 4,060,670 | 11/1977 | Tamminen ............................ 429/154 |
| 4,080,728 | 3/1978 | Buckler ................................ 29/623.4 |
| 4,091,186 | 5/1978 | Ott et al. . |

(List continued on next page.)

FOREIGN PATENT DOCUMENTS

| | | |
|---|---|---|
| 044 753 A1 | 1/1982 | European Pat. Off. . |
| 145 498 A2 | 6/1985 | European Pat. Off. . |
| 0 170 883 A1 | 2/1986 | European Pat. Off. . |
| 177 225 A1 | 4/1986 | European Pat. Off. . |
| 0 225 767 A2 | 6/1987 | European Pat. Off. . |
| 244 683 A1 | 11/1987 | European Pat. Off. . |
| 310 075 A2 | 4/1989 | European Pat. Off. . |
| 336 102 A2 | 10/1989 | European Pat. Off. . |
| 569 035 A1 | 11/1993 | European Pat. Off. . |
| 570 590 A1 | 11/1993 | European Pat. Off. . |
| 584 639 A1 | 3/1994 | European Pat. Off. . |
| 643 429 A2 | 3/1995 | European Pat. Off. . |
| 652 620 A1 | 5/1995 | European Pat. Off. . |
| 700 109 A1 | 3/1996 | European Pat. Off. . |

*Primary Examiner*—Maria Nuzzolillo
*Assistant Examiner*—Tracy Dove
*Attorney, Agent, or Firm*—Altera Law Group LLC

[57] ABSTRACT

An improved electrochemical generator is disclosed. The electrochemical generator includes a thin-film electrochemical cell which is maintained in a state of compression through use of an internal or an external pressure apparatus. A thermal conductor, which is connected to at least one of the positive or negative contacts of the cell, conducts current into and out of the cell and also conducts thermal energy between the cell and thermally conductive, electrically resistive material disposed on a vessel wall adjacent the conductor. The thermally conductive, electrically resistive material may include an anodized coating or a thin sheet of a plastic, mineral-based material or conductive polymer material. The thermal conductor is fabricated to include a resilient portion which expands and contracts to maintain mechanical contact between the cell and the thermally conductive material in the presence of relative movement between the cell and the wall structure. The electrochemical generator may be disposed in a hermetically sealed housing.

23 Claims, 17 Drawing Sheets

U.S. PATENT DOCUMENTS

| | | | |
|---|---|---|---|
| 4,098,965 | 7/1978 | Kinsman | 429/153 |
| 4,105,807 | 8/1978 | Arora | 427/126 |
| 4,137,627 | 2/1979 | Kinsman | 29/623.4 |
| 4,150,266 | 4/1979 | Patrichi . | |
| 4,152,825 | 5/1979 | Bruneau | 29/623.2 |
| 4,207,389 | 6/1980 | Gunther et al. | 429/164 |
| 4,209,479 | 6/1980 | Gunther et al. | 264/104 |
| 4,233,371 | 11/1980 | Dorrestijn | 429/152 |
| 4,238,721 | 12/1980 | DeLuca et al. . | |
| 4,241,152 | 12/1980 | Klink . | |
| 4,303,877 | 12/1981 | Meinhold . | |
| 4,321,435 | 3/1982 | Grieger et al. . | |
| 4,322,484 | 3/1982 | Sugalski . | |
| 4,342,978 | 8/1982 | Meister . | |
| 4,370,531 | 1/1983 | Tobin . | |
| 4,383,013 | 5/1983 | Bindin et al. . | |
| 4,409,086 | 10/1983 | Haas et al. . | |
| 4,409,538 | 10/1983 | Tabata . | |
| 4,429,026 | 1/1984 | Bruder | 429/152 |
| 4,436,792 | 3/1984 | Tomino et al. . | |
| 4,477,545 | 10/1984 | Akridge et al. . | |
| 4,479,083 | 10/1984 | Sullivan . | |
| 4,490,707 | 12/1984 | O'Leary . | |
| 4,495,259 | 1/1985 | Uba . | |
| 4,507,857 | 4/1985 | Epstein et al. | 29/623.2 |
| 4,517,265 | 5/1985 | Belanger et al. . | |
| 4,518,665 | 5/1985 | Fujita et al. . | |
| 4,525,439 | 6/1985 | Simonton | 429/162 |
| 4,547,438 | 10/1985 | McArthur et al. | 429/82 |
| 4,571,468 | 2/1986 | Weldon . | |
| 4,654,278 | 3/1987 | McManis, III et al. . | |
| 4,664,993 | 5/1987 | Sturgis et al. | 429/178 |
| 4,670,703 | 6/1987 | Williams . | |
| 4,691,085 | 9/1987 | Swanson . | |
| 4,692,577 | 9/1987 | Swanson . | |
| 4,707,795 | 11/1987 | Alber et al. . | |
| 4,752,540 | 6/1988 | Chua et al. | 429/56 |
| 4,758,483 | 7/1988 | Armand et al. . | |
| 4,816,354 | 3/1989 | Tamminen | 429/162 |
| 4,824,746 | 4/1989 | Belanger et al. . | |
| 4,828,939 | 5/1989 | Turley et al. . | |
| 4,830,936 | 5/1989 | Planchat et al. | 429/110 |
| 4,851,307 | 7/1989 | Armand et al. . | |
| 4,852,684 | 8/1989 | Packard . | |
| 4,883,726 | 11/1989 | Peled et al. | 424/120 |
| 4,887,348 | 12/1989 | Tamminen | 29/623.2 |
| 4,897,917 | 2/1990 | Gauthier et al. . | |
| 4,911,993 | 3/1990 | Turley et al. | 429/27 |
| 4,913,259 | 4/1990 | Packard . | |
| 4,923,582 | 5/1990 | Abrahamson et al. . | |
| 4,927,717 | 5/1990 | Turley et al. | 429/27 |
| 4,961,043 | 10/1990 | Koenck . | |
| 4,967,136 | 10/1990 | Nofzinger . | |
| 4,971,531 | 11/1990 | Aikioniemi . | |
| 4,973,936 | 11/1990 | Dimpault-Darcy et al. . | |
| 4,997,732 | 3/1991 | Austin et al. | 429/153 |
| 5,008,161 | 4/1991 | Johnston | 429/7 |
| 5,057,385 | 10/1991 | Hope et al. . | |
| 5,066,555 | 11/1991 | Tamminen | 429/121 |
| 5,070,787 | 12/1991 | Weldon et al. . | |
| 5,071,652 | 12/1991 | Jones et al. . | |
| 5,089,027 | 2/1992 | Rossoll et al. | 29/623.2 |
| 5,162,171 | 11/1992 | Jones . | |
| 5,180,641 | 1/1993 | Burns et al. . | |
| 5,197,889 | 3/1993 | Rizzo et al. . | |
| 5,199,239 | 4/1993 | Younger . | |
| 5,204,194 | 4/1993 | Miller et al. . | |
| 5,227,259 | 7/1993 | Weaver et al. . | |
| 5,227,264 | 7/1993 | Duval et al. . | |
| 5,283,512 | 2/1994 | Stadnick et al. . | |
| 5,300,373 | 4/1994 | Shackle . | |
| 5,313,152 | 5/1994 | Wozniak et al. . | |
| 5,324,597 | 6/1994 | Leadbetter et al. . | |
| 5,337,042 | 8/1994 | Hormel et al. . | |
| 5,346,786 | 9/1994 | Hodgetts . | |
| 5,354,630 | 10/1994 | Earl et al. . | |
| 5,363,405 | 11/1994 | Hormel . | |
| 5,382,480 | 1/1995 | Molyneux . | |
| 5,384,212 | 1/1995 | Heiman et al. . | |
| 5,385,793 | 1/1995 | Tiedemann et al. . | |
| 5,393,617 | 2/1995 | Klein . | |
| 5,401,595 | 3/1995 | Kagawa et al. . | |
| 5,409,787 | 4/1995 | Blanyer et al. . | |
| 5,415,954 | 5/1995 | Gauthier et al. . | |
| 5,422,200 | 6/1995 | Hope et al. . | |
| 5,423,110 | 6/1995 | Gauthier et al. . | |
| 5,438,249 | 8/1995 | Chang et al. . | |
| 5,478,667 | 12/1995 | Shackle et al. . | |
| 5,478,668 | 12/1995 | Gozdz et al. | 429/127 |
| 5,479,083 | 12/1995 | Brainard . | |
| 5,486,680 | 1/1996 | Lieberman | 219/211 |
| 5,487,958 | 1/1996 | Tura . | |
| 5,503,947 | 4/1996 | Kelly et al. . | |
| 5,503,948 | 4/1996 | MacKay et al. . | |
| 5,504,415 | 4/1996 | Podrazhansky et al. . | |
| 5,519,563 | 5/1996 | Higashijimaa et al. . | |
| 5,521,024 | 5/1996 | Sasaki et al. . | |
| 5,528,122 | 6/1996 | Sullivan et al. . | |
| 5,530,336 | 6/1996 | Eguchi et al. . | |
| 5,532,087 | 7/1996 | Nerz et al. . | |
| 5,547,775 | 8/1996 | Eguchi et al. . | |
| 5,547,780 | 8/1996 | Kagawa et al. . | |
| 5,548,200 | 8/1996 | Nor et al. . | |
| 5,552,243 | 9/1996 | Klein . | |
| 5,556,576 | 9/1996 | Kim . | |
| 5,561,380 | 10/1996 | Sway-Tin et al. . | |
| 5,563,002 | 10/1996 | Harshe . | |
| 5,567,539 | 10/1996 | Takahashi et al. . | |
| 5,568,039 | 10/1996 | Fernandez . | |
| 5,569,063 | 10/1996 | Morioka et al. . | |
| 5,569,550 | 10/1996 | Garrett et al. . | |
| 5,573,869 | 11/1996 | Hwang et al. . | |
| 5,582,931 | 12/1996 | Soichiro . | |
| 5,585,207 | 12/1996 | Wakabe et al. . | |
| 5,589,290 | 12/1996 | Klink et al. . | |
| 5,593,604 | 1/1997 | Beasly et al. . | |
| 5,594,320 | 1/1997 | Pacholok et al. . | |
| 5,595,835 | 1/1997 | Miyamoto et al. . | |
| 5,595,839 | 1/1997 | Hossain . | |
| 5,599,636 | 2/1997 | Braun . | |
| 5,600,230 | 2/1997 | Dunstan . | |
| 5,602,481 | 2/1997 | Fukuyama . | |
| 5,610,495 | 3/1997 | Yee et al. . | |
| 5,612,153 | 3/1997 | Moulton et al. . | |
| 5,618,641 | 4/1997 | Arias . | |
| 5,619,417 | 4/1997 | Kendall . | |
| 5,620,808 | 4/1997 | Wheeler et al. . | |
| 5,622,789 | 4/1997 | Young . | |
| 5,623,196 | 4/1997 | Fernandez et al. . | |
| 5,626,990 | 5/1997 | Miller et al. . | |
| 5,631,537 | 5/1997 | Armstrong . | |
| 5,633,573 | 5/1997 | van Phuoc et al. . | |
| 5,637,981 | 6/1997 | Nagai et al. . | |
| 5,643,044 | 7/1997 | Lund . | |
| 5,647,534 | 7/1997 | Kelz et al. . | |
| 5,648,713 | 7/1997 | Mangez . | |
| 5,650,240 | 7/1997 | Rogers . | |
| 5,652,498 | 7/1997 | Edye et al. . | |
| 5,652,502 | 7/1997 | van Phuoc et al. . | |
| 5,654,622 | 8/1997 | Toya et al. . | |
| 5,670,272 | 9/1997 | Cheu et al. | 429/162 |
| 5,824,432 | 10/1998 | Currle . | |

FOREIGN PATENT DOCUMENTS

| | | |
|---|---|---|
| 0 721 247 A2 | 7/1996 | European Pat. Off. . |
| 774 795 A2 | 5/1997 | European Pat. Off. . |
| 780 920 A1 | 6/1997 | European Pat. Off. . |
| 2 511 547 | 2/1983 | France . |
| 2 721 407 | 12/1995 | France . |
| 3246968 A1 | 7/1984 | Germany . |
| 4218381 C1 | 5/1993 | Germany . |
| 42 25 746 A1 | 2/1994 | Germany . |
| 94 15 874 | 12/1994 | Germany . |
| 19618897 A1 | 11/1997 | Germany . |
| 59-091658 | 5/1984 | Japan . |
| 59-117061 | 7/1984 | Japan . |
| 59-139555 | 8/1984 | Japan . |
| 61-099278 | 5/1986 | Japan . |
| 63-062156 | 3/1988 | Japan . |
| 01320758 | 12/1989 | Japan . |
| 04294071 | 10/1992 | Japan . |
| 05166533 | 7/1993 | Japan . |
| 6-036756 | 2/1994 | Japan . |
| 6-203823 | 7/1994 | Japan . |
| 07250788 | 10/1995 | Japan . |
| 07282841 | 10/1995 | Japan . |
| 08115711 | 5/1996 | Japan . |
| 9-017416 | 1/1997 | Japan . |
| 1066-385 | 6/1986 | Russian Federation . |
| 1582979 | 1/1981 | United Kingdom . |
| 2 206 726 | 1/1989 | United Kingdom . |
| 2 282 924 | 4/1995 | United Kingdom . |
| 2295718 | 6/1996 | United Kingdom . |
| WO 91/17451 | 11/1991 | WIPO . |
| WO 92/02963 | 2/1992 | WIPO . |
| WO 93/01624 | 1/1993 | WIPO . |
| WO 94/14206 | 6/1994 | WIPO . |
| WO 95/00978 | 1/1995 | WIPO . |
| WO 95/26055 | 9/1995 | WIPO . |
| WO 95/34824 | 12/1995 | WIPO . |
| WO 96/17397 | 6/1996 | WIPO . |
| WO 96/19816 | 6/1996 | WIPO . |
| WO 96/22523 | 7/1996 | WIPO . |
| WO 98/11620 | 3/1998 | WIPO . |

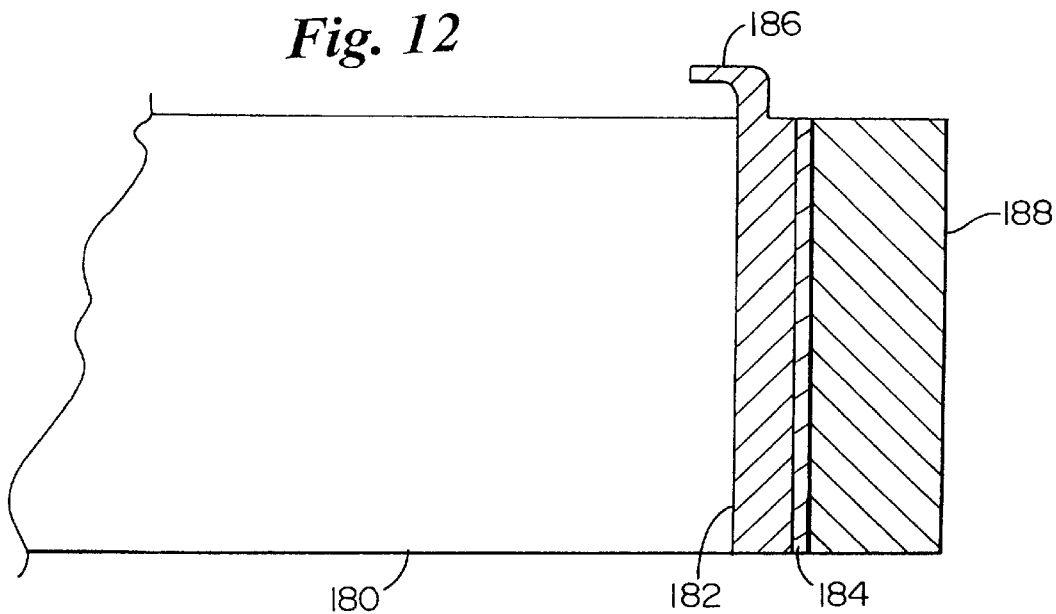
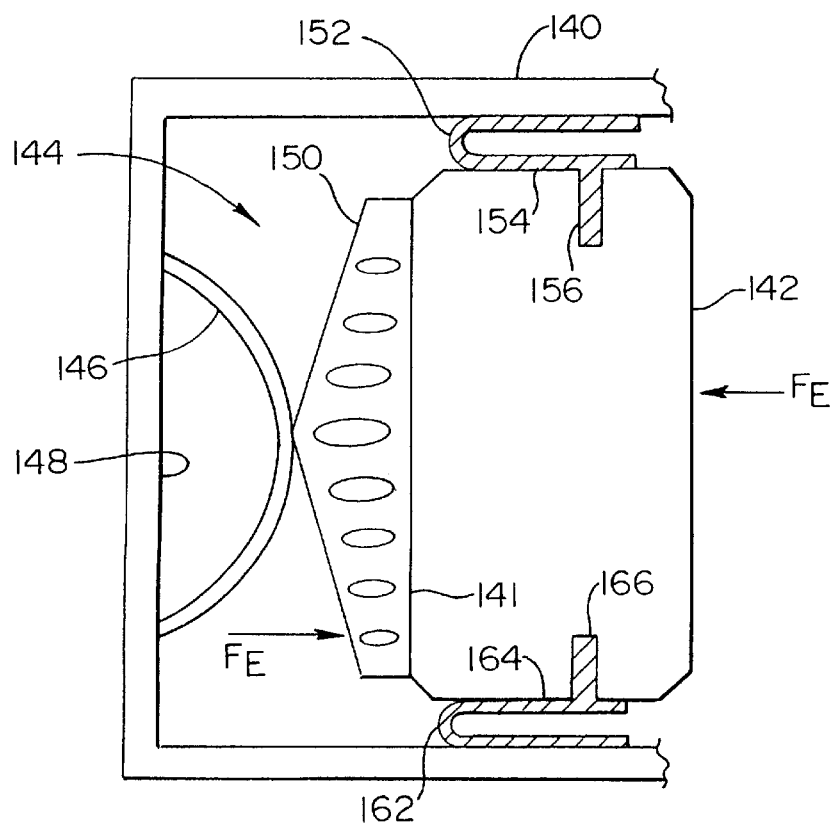

RECHARGEABLE THIN-FILM ELECTROCHEMICAL GENERATOR

GOVERNMENT LICENSE RIGHTS

The Government of the United States of America has rights in this invention pursuant to Cooperative Agreement No. DE-FC02-91CE50336 awarded by the U.S. Department of Energy.

FIELD OF THE INVENTION

This invention relates generally to energy storing devices, and more particularly, to an apparatus and method for improving the performance of a thin-film electrochemical generator.

BACKGROUND OF THE INVENTION

The demand for new and improved electronic and electromechanical systems has placed increased pressure on the manufacturers of energy storing devices to develop battery technologies that provide for high energy generation in a low-volume package. Conventional battery systems, such as those that utilize lead acid for example, are often unsuitable for use in high-power, low-weight applications. Other known battery technologies may be considered too unstable or hazardous for use in consumer product applications.

A number of advanced battery technologies have recently been developed, such as metal hydride (e.g., Ni-MH), lithium-ion, and lithium polymer cell technologies, which would appear to provide the requisite level of energy production and safety margins for many commercial and consumer applications. Such advanced battery technologies, however, often exhibit characteristics that provide challenges for the manufacturers of advanced energy storage devices.

For example, such advanced power generating systems typically produce a significant amount of heat which, if not properly dissipated, can result in a thermal runaway condition and eventual destruction of the cells, as well as the system being powered by the cells. The thermal characteristics of an advanced battery cell must therefore be understood and appropriately considered when designing a battery system suitable for use in commercial and consumer devices and systems. A conventional approach of providing a heat transfer mechanism external to such a cell, for example, may be inadequate to effectively dissipate heat from internal portions of the cell. Such conventional approaches may also be too expensive or bulky in certain applications. The severity of consequences resulting from short-circuit and thermal run-away conditions increases significantly when advanced high-energy electrochemical cells are implicated.

Other characteristics of advanced battery technologies provide additional challenges for the designers of advanced energy storage devices. For example, certain advanced cell structures are subject to cyclical changes in volume as a consequence of variations in the state of charge of the cell. The total volume of such a cell may vary as much as five to six percent or more during charge and discharge cycling. Such repetitive changes in the physical size of a cell significantly complicates the mechanical housing design and the thermal management strategy. The electrochemical, thermal, and mechanical characteristics of an advanced battery cell must therefore be understood and appropriately considered when designing an energy storage system suitable for use in commercial and consumer devices and systems.

There is a need in the advanced battery manufacturing industry for an electrochemical generator that exhibits high-energy output and good heat transfer characteristics, and one that provides for safe and reliable use in a wide range of applications. There exists a further need for a packaging configuration which accommodates the unique dynamics of an electrochemical cell which is subject to volumetric changes during charge and discharge cycling. The present invention fulfills these and other needs.

SUMMARY OF THE INVENTION

The present invention is directed to an improved electrochemical generator. The electrochemical generator includes a thin-film electrochemical cell which is maintained in a state of compression through use of an internal or an external pressure apparatus. A thermal conductor, which is connected to at least one of the positive or negative contacts of the cell, conducts current into and out of the cell and also conducts thermal energy between the cell and thermally conductive, electrically resistive material disposed on a vessel wall adjacent the conductor. The thermally conductive, electrically resistive material may include an anodized coating or a thin sheet of a plastic, mineral-based material or conductive polymer material. The thermal conductor is fabricated to include a resilient portion which expands and contracts to maintain mechanical contact between the cell and the thermally conductive material in the presence of relative movement between the cell and the wall structure. The electrochemical generator may be disposed in a hermetically sealed housing.

BRIEF DESCRIPTION OF THE DRAWINGS

FIG. 11 illustrates an embodiment of a force generating apparatus for exerting an external compressive force on an electrochemical cell;

FIG. 12 is a cross-sectional view of an electrochemical cell having a thermal conductor disposed adjacent a planer structure exhibiting good thermal conductivity and poor electrical conductivity characteristics;

DETAILED DESCRIPTION OF THE EMBODIMENTS

Figure 1:
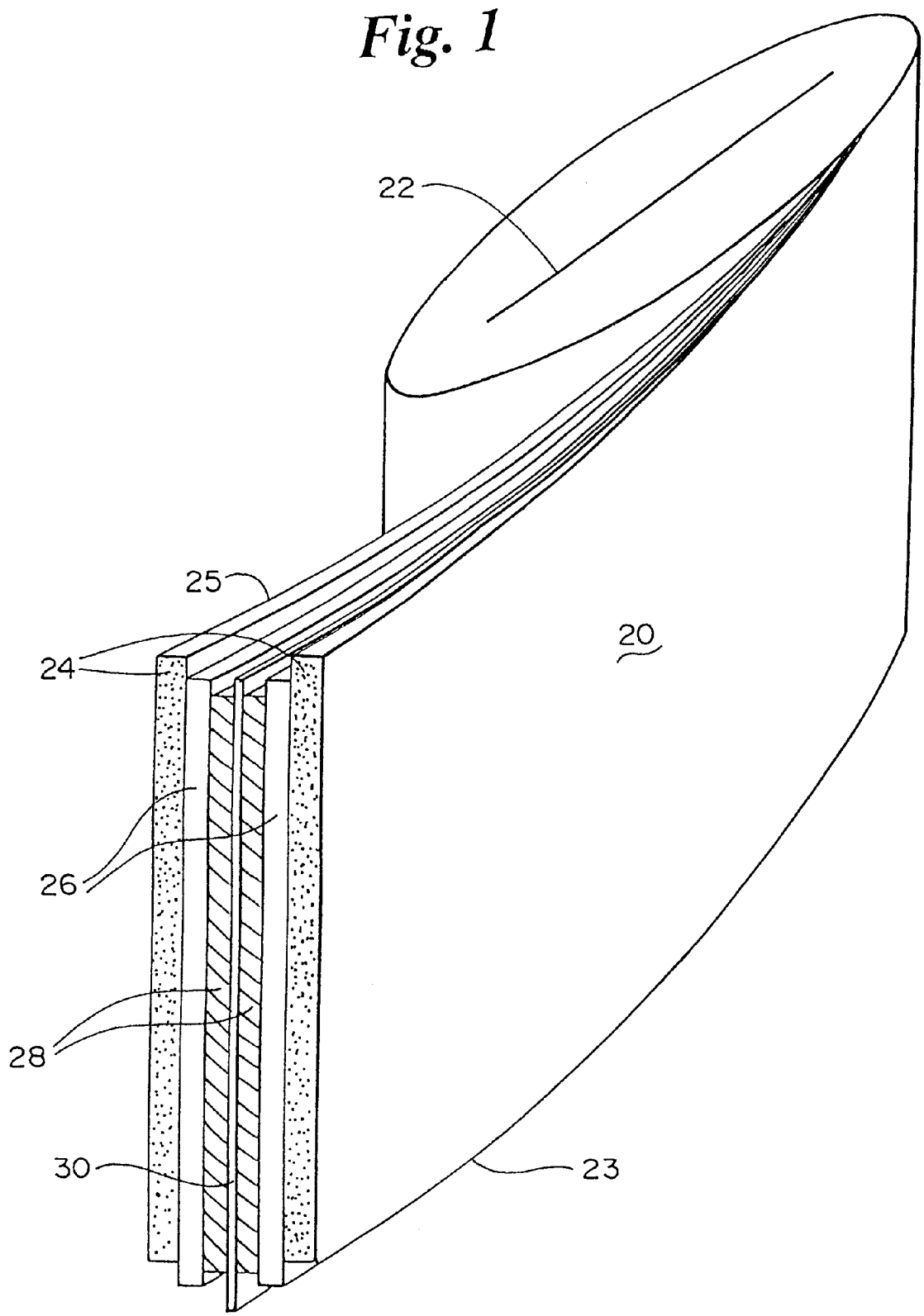
FIG. 1 illustrates an embodiment of a solid-state, thin-film electrochemical cell having a prismatic configuration.

Referring to the drawings, and more particularly to FIG. 1, there is illustrated an embodiment of a solid-state, thin-film electrochemical cell which may be utilized in the fabrication of a rechargeable electrochemical generator for use in a wide range of applications. The electrochemical cell 20 is shown as having a flat wound prismatic configuration in which a thin-film solid electrolyte 26 is disposed between a film 24 constituting an anode and a film 28 constituting a cathode. A central cathode current collector film 30 is disposed between each of the cathode films 28. The anode films 24 are laterally offset relative to the cathode current collector 30 so as to expose the anode 24 along a first edge 25 of the cell 20, and to expose the cathode current collector 30 along a second edge 23 of the cell 20. The embodiment shown in FIG. 1 includes a core element 22, such as a foam or metal spring element, about which the thin-film electrochemical cell 20 is wound.

Figure 2A:
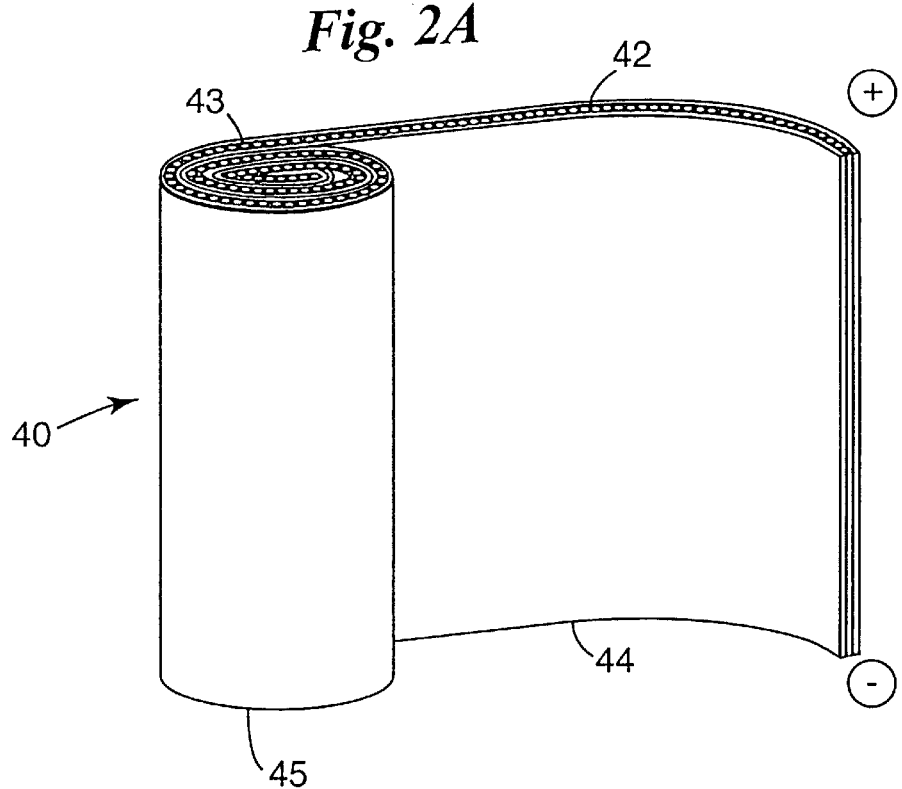
FIGS. 2A–2C illustrate various embodiments of a thin-film electrochemical cell.
Figure 2B:
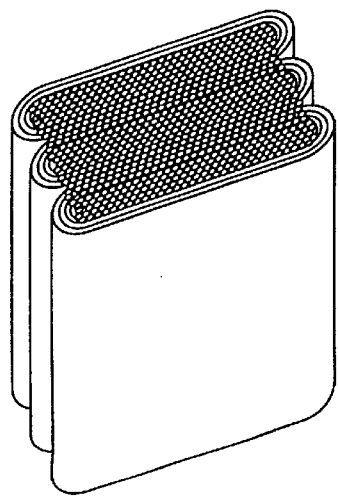
Figure 2C:
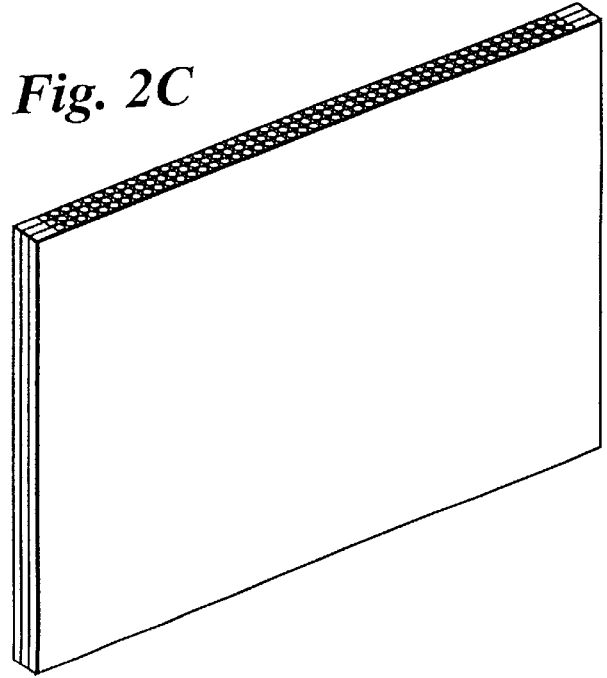

In FIGS. 2A–2C, there is illustrated various embodiments of a thin-film electrochemical cell which may be used in the fabrication of a rechargeable energy storing device. As is shown in FIG. 2A, a thin-film electrochemical cell may be packaged in a "jelly roll" configuration so as to form a generally cylindrical cell structure in which a first edge 42 of the cell forms a positive contact 43, and a second edge 44 forms a negative contact 45. The positive and negative contacts 43, 45 are formed typically by use of a known metal spraying technique.

FIGS. 2B and 2C illustrate alternative packaging configurations for a thin-film rechargeable electrochemical cell. A flat roll configuration, shown in FIG. 2B, or a flat stack configuration, shown in FIG. 2C, provides for the aggregation of a relatively large thin-film cell surface area within a relatively small packaging configuration. Such geometries minimize voltage losses and allow for the efficient transfer of electrical energy to and from the multi-layered cell structure.

In accordance with one embodiment, and with reference to FIG. 1, the electrochemical cell 20 includes a solid polymer electrolyte 26 which constitutes an ion transporting membrane, a lithium metal anode 24, and a vanadium oxide cathode 28. These film elements are fabricated to form a thin-film laminated prismatic structure, which may include an insulation film such as polypropylene film. A known sputtering metallization process is employed to form current collecting contacts along the edges 25, 23 of the anode 24 and cathode 28 films, respectively. It is noted that the metal-sprayed contacts provide for superior current collection along the length of the anode and cathode film edges 25, 23, and demonstrate good electrical/mechanical contact and heat transfer characteristics.

The cell shown in FIG. 1 includes a central cathode current collector 30 which is disposed between each of the two cathode films 28 to form a bi-face cell configuration. A mono-face cell configuration may alternatively be employed in which a single cathode collector 30 is associated with a single anode/electrolyte/cathode element combination. In this configuration, an insulating film is typically disposed between individual anode/electrolyte/cathode/collector element combinations.

In general, the active materials constituting the solid-state, thin-film electrochemical cell retain chemical and mechanical integrity at temperatures well beyond typical operating temperatures. For example, temperatures of up to 180° C. may be tolerated. It is to be understood that various electrochemical cell configurations other than those depicted in the figures may be appropriate to satisfy the electrical, mechanical, and thermal requirements of a particular application. Various embodiments of the electrochemical cells depicted generally in the figures may be fabricated in accordance with the methodologies disclosed in U.S. Pat. Nos. 5,423,110, 5,415,954, and 4,897,917.

Figure 3A:
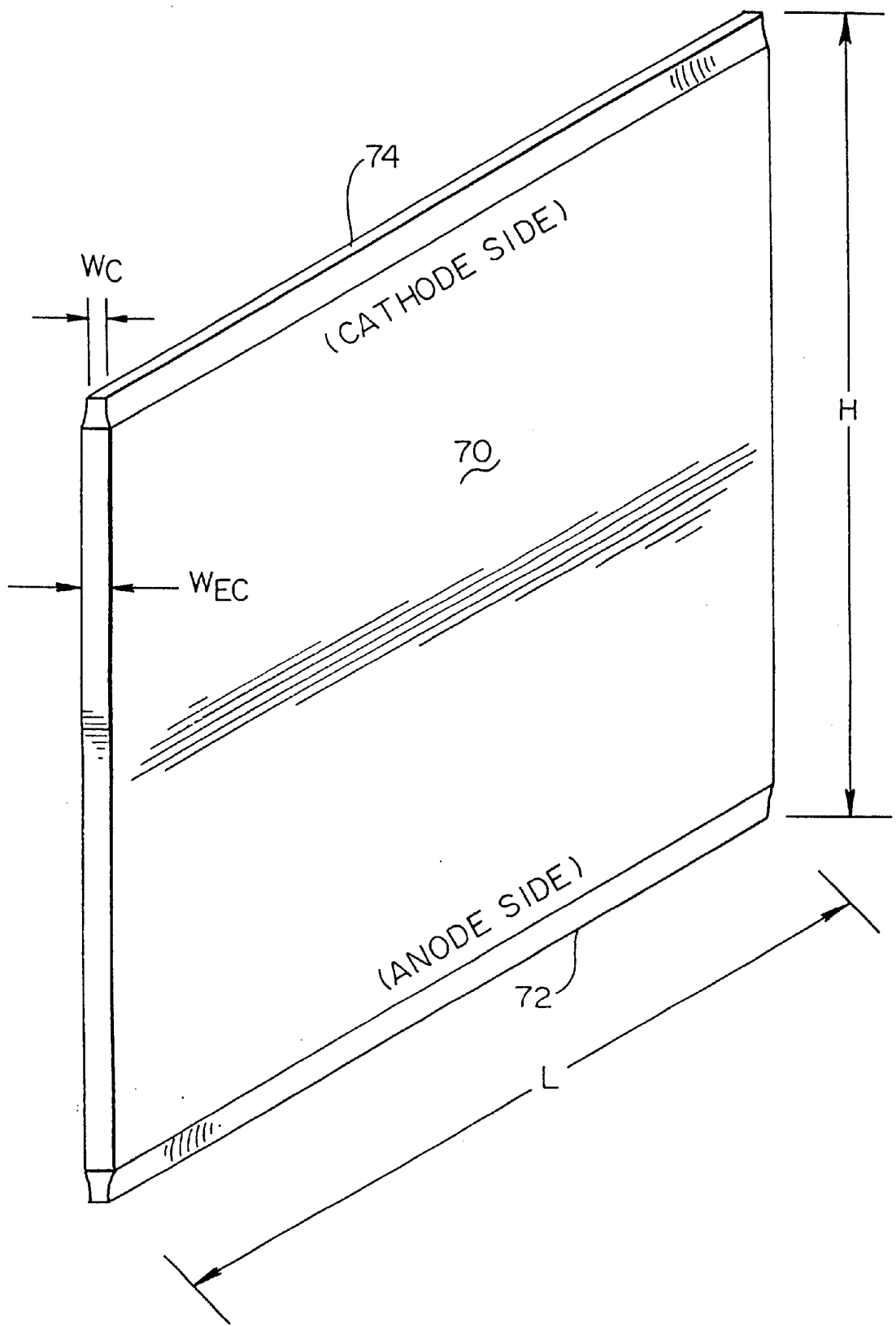
FIG. 3A is an illustration of another electrochemical cell embodiment having a prismatic configuration.
Figure 3C:
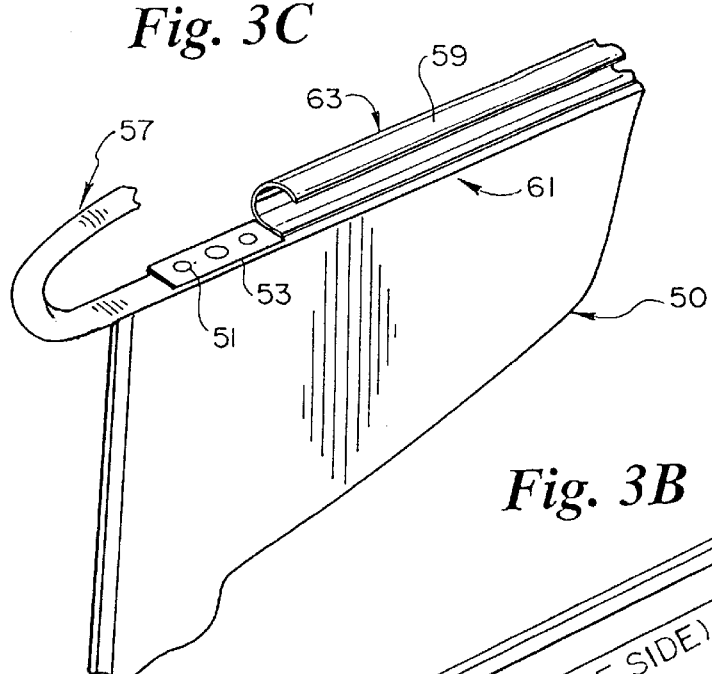
FIGS. 3B–3C illustrate two embodiments of a thermal conductor which may be attached to one or both of the anode and cathode contacts of a prismatic electrochemical cell.
Figure 3B:
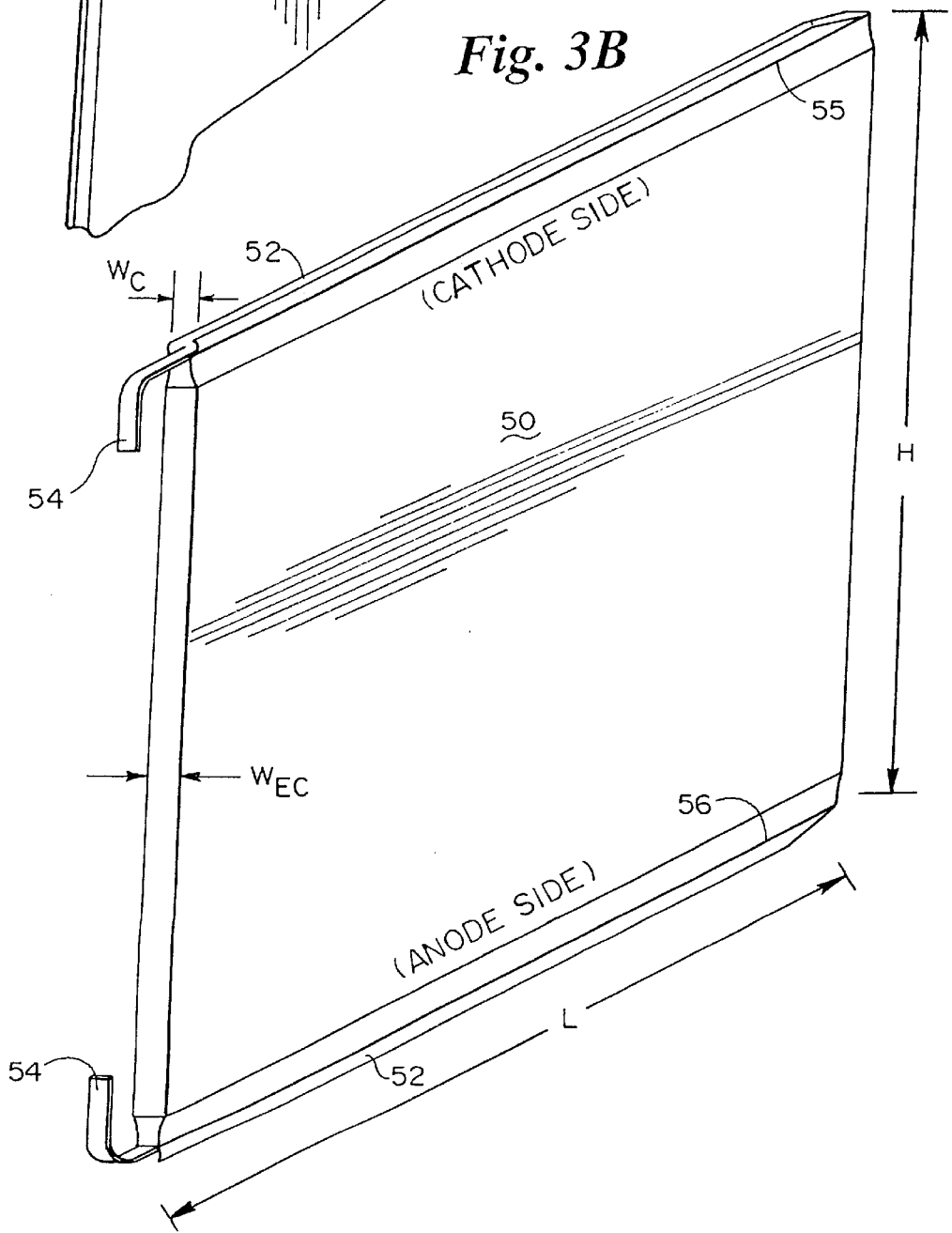
Figure 3D:
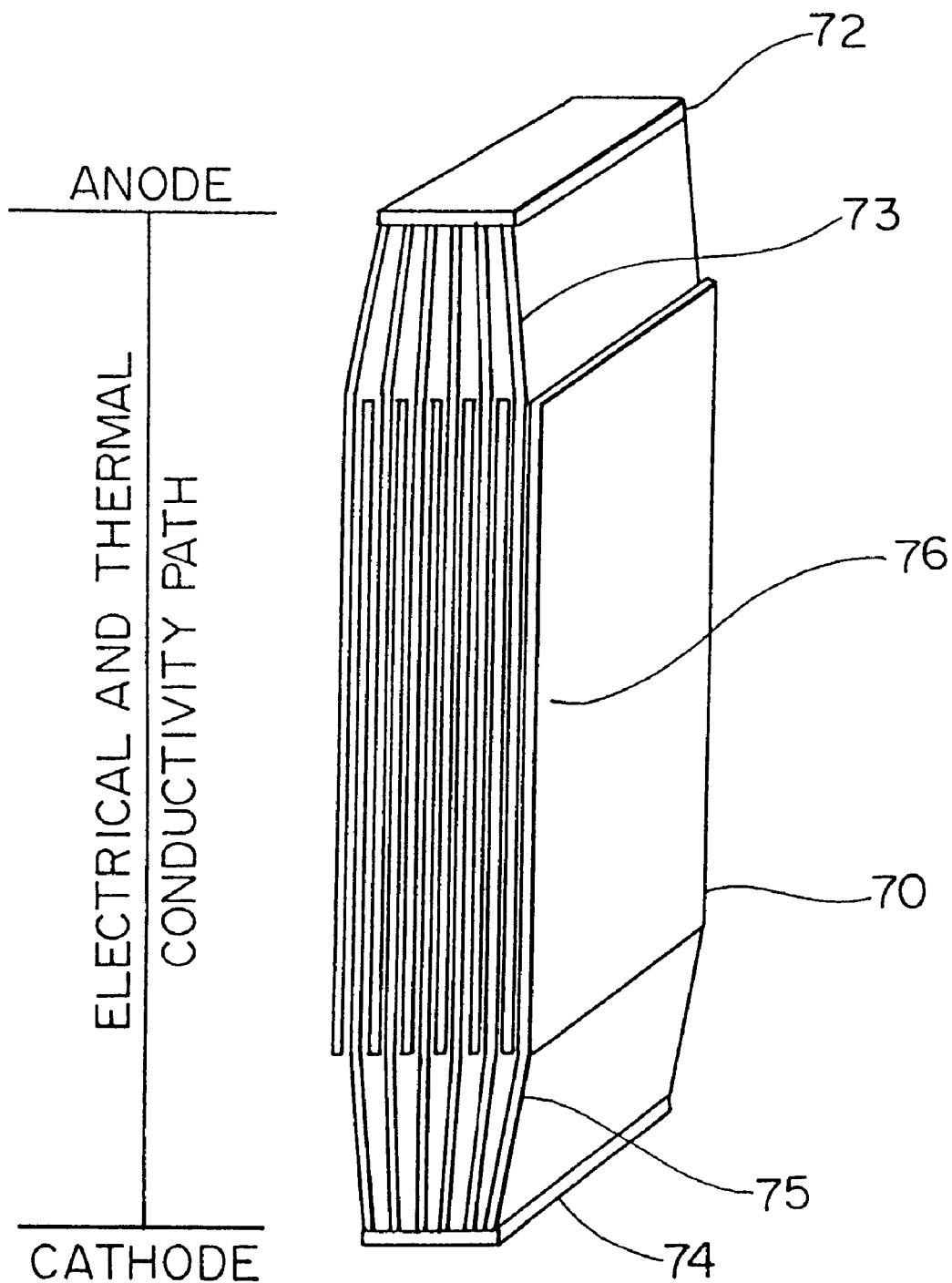
FIG. 3D illustrates another embodiment of a prismatic thin-film electrochemical cell.

Concerning FIGS. 3A and 3D, an embodiment of a prismatic electrochemical cell 70 is shown in which an anode contact 72 and a cathode contact 74 is formed respectively along opposing edges of the cell 70. The electrochemical cell 70 shown in FIG. 3D illustrates the laterally offset anode and cathode film layers 73, 75 which terminate respectively at common anode and cathode contacts 72, 74. A copper spraying technique is typically employed to form anode and cathode contacts 72, 74.

During charge and discharge cycling, electrical energy is conducted preferentially along the surfaces of the anode and cathode films 73, 75 and through the anode and cathode contacts 72, 74. During electrical discharge, the active portion 76 of the cell 70 produces an appreciable amount of thermal energy which is preferentially conducted along the anode and cathode film surfaces, thus sharing the same conductivity path as that for the electrical energy produced by the cell 70. As such, the contacts 72, 74 respectively disposed on the edge portions of the extended anode and cathode film layers 73, 75 provide a site for establishing both electrical and thermal connectivity with the cell 70.

Figure 4:
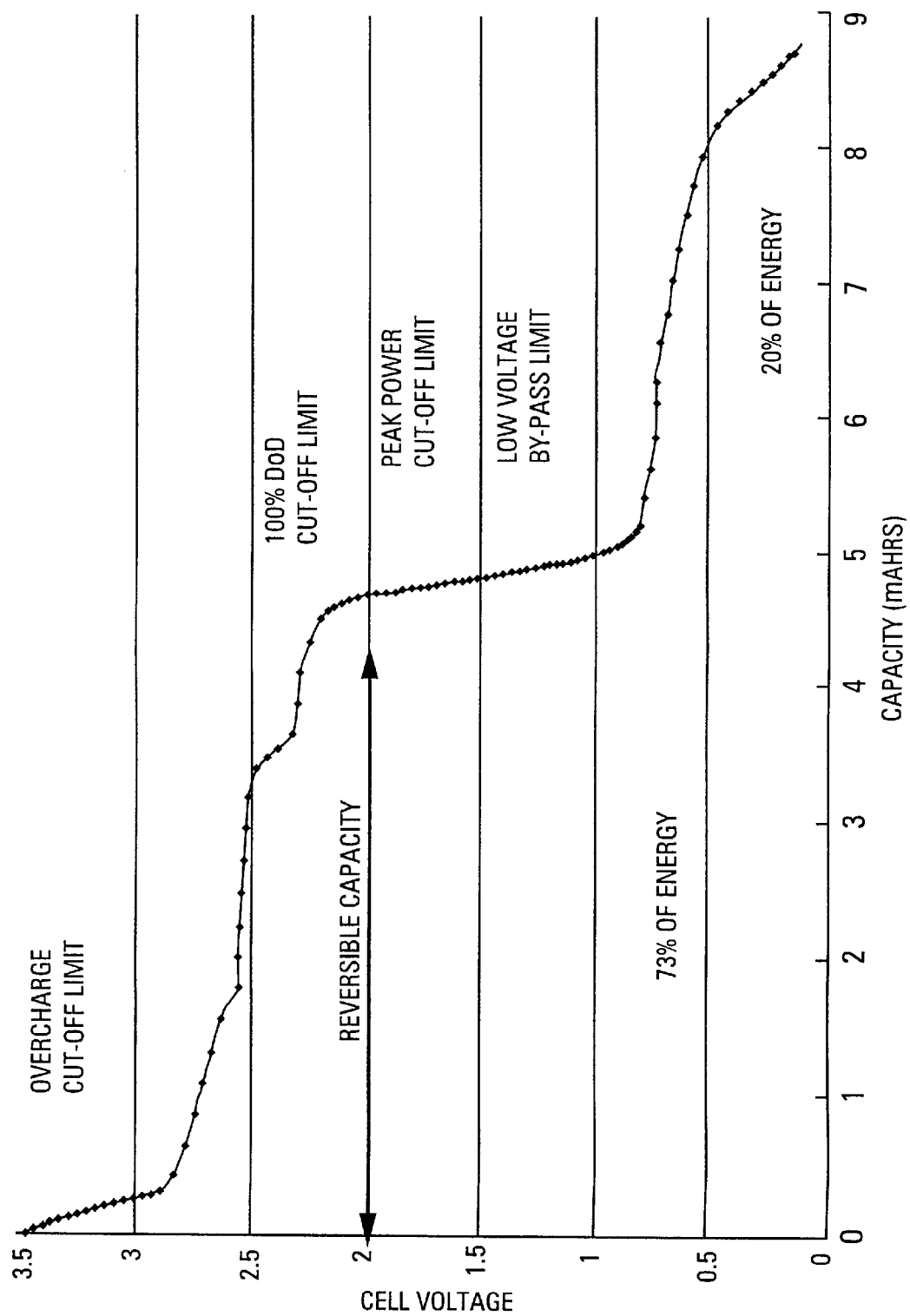
FIG. 4 is a graphical representation of a relationship between voltage and capacity for an electrochemical cell of the type illustrated in FIG. 1.

The electrochemical cell shown in FIGS. 3A and 3D may be fabricated to have a length L of approximately 135 mm, a height H of approximately 149 mm, and a width $W_{ec}$ of approximately 5.4 mm or $W_{ec}$ of approximately 5.86 mm when including a foam core element 22. The width $W_c$ of the cathode contact 74 and the anode contact 72 is approximately 3.9 mm, respectively. A cell having these dimensions typically exhibits a nominal energy rating of approximately 36.5 Wh, a peak power rating of 87.0 W at 80 percent depth of discharge (DOD), a cell capacity of 14.4 Ah, and a nominal voltage rating of 3.1 volts at full charge. The graph of FIG. 4 illustrates a relationship between voltage and capacity of a typical prismatic thin-film cell having the above-described dimensions and construction.

In Table 1 below, various thermal properties are provided for an electrochemical cell maintained at a temperature of approximately 60° C. and having a structure similar to that illustrated in FIGS. 3A–3D.

TABLE 1

| | Thermal Conductivity (W/m° C.) | | | |
|---|---|---|---|---|
| Section | Direction of the film thickness | Direction of the connectors | Density (kg/m³) | Specific Heat (J/kg ° C.) |
| Active Section | 0.4042 | 48.10 | 1356 | 1411 |
| Anode Side, Inactive Zone | 0.0466 | 28.90 | 252 | 2714 |
| Cathode Side, Inactive Side | 0.0388 | 18.45 | 441 | 1470 |
| Complete Cell | | | 1218 | 1435 |

| | Other Components | |
|---|---|---|
| Component | Thermal Conductivity (W/m ° C.) | Density × specific heat (kJ/m³ ° C.) |
| Cell's core | 0.071 | 401.3 |
| Metallization | 366.7 | 3254.6 |
| Spring type terminal | 134.5 | 3254.6 |
| Vessel wall - anodized | 178.8 | 2566.9 |

The tabulation of thermal conductivity values demonstrates that the preferred thermal conductivity path is laterally along the surface of the film layers of the cell rather than axially through the film material.

Those skilled in the art will appreciate that a conventional approach of attaching an electrical lead to an end portion of the anode and cathode contacts 72, 74 would prove to be an inadequate configuration for effectively conducting heat into and out of the cell 70. Although this relatively long conductivity path would likely be satisfactory for purposes of conducting electrical current between the cell 70 and an external connection, such a configuration would be incapable of conducting a sufficient amount of thermal energy into or out of the cell 70 to ensure reliable and safe operation of the cell 70.

In the embodiment of a prismatic electrochemical cell 50 shown in FIG. 3B, a thermal conductor 52 in accordance with one embodiment of the present invention advantageously provides for the efficient transfer of heat between the cell and an adjacently disposed heat sink/source, such as a thermally conductive wall of a protective enclosure. The thermal conductor 52 is spot welded or otherwise attached to each of the anode and cathode contacts 56, 55, respectively. The thermal conductor 52 is typically disposed along the length of the anode contact 56 and the cathode contact 55, and typically includes an electrical connection lead 54 for conducting current into and out of the electrochemical cell 50, the current being collected and conducted preferentially along the anode and cathode contacts 56, 55.

The embodiment of a thermal conductor 63 shown in FIG. 3C includes a copper tab 53 that extends along the length of a sprayed metal anode or cathode contact 61. The copper tab 53 includes a resilient member 59 through which heat is transferred between the cell 50 and an adjacently disposed heat sink, such as a wall of a metallic housing. The copper tab 53 is spot welded to the sprayed metal contact 61 at a number of weld locations 51. A flexible electrical lead 57 is ultrasonically welded to the end of the copper tab 53. Current is conducted primarily along the sprayed metal contact 61 of the cell 50 and communicated to external connections via the flexible electrical leads 57.

The thermal conductor 63 provides a thermal flux path for transferring thermal energy between the electrochemical cell 50 and a thermally conductive, electrically resistive material or element disposed adjacent the cell 50. It is to be understood that a thermally conductive, electrically resistive material, element or structure as described herein refers to a surface coating/treatment or separate material that permits a sufficient amount of heat to be conducted therethrough, yet is electrically resistive to the flow of current relative to a current path provided for conducting current into and out of an electrochemical cell.

An anodized coating, for example, may have a thickness that permits a sufficient amount of thermal energy to be conducted therethrough, yet is sufficiently resistive to electrical current relative to the anode and cathode contacts of the cell or the thermal conductor. By way of further example, a thermally conductive foam element may be employed, with the density of thermally conductive particles impregnated therein being selected to provide a desired balance between thermal and electrical conductivity characteristics.

Figure 5:
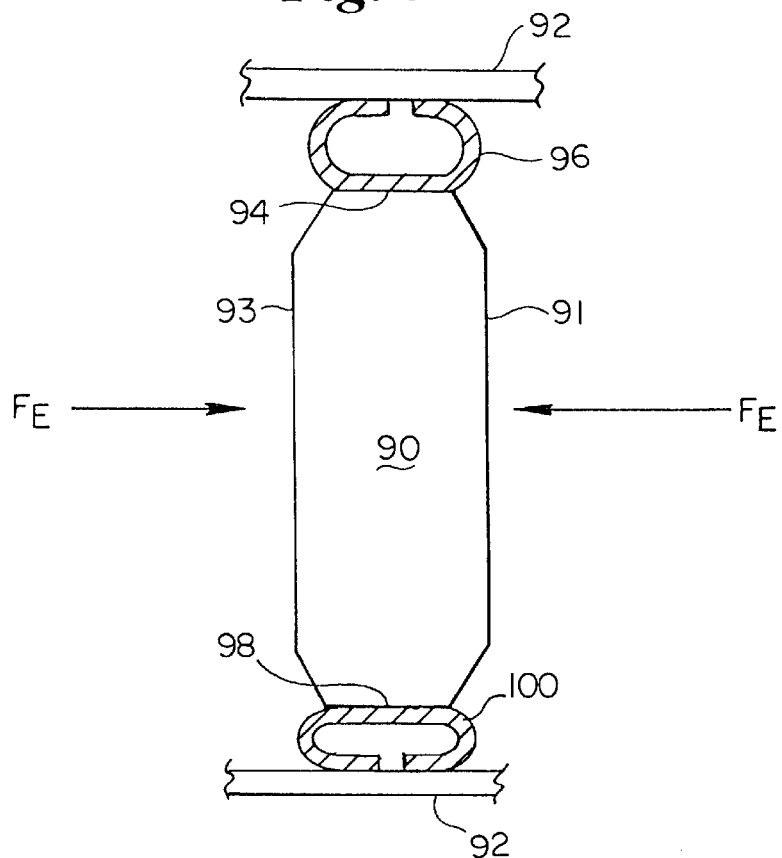
FIG. 5 is a top view of an electrochemical cell including anode and cathode thermal conductors constrained between substantially planer wall structures.

In FIG. 5, there is provided a top cross-sectional view of an electrochemical cell 90 including thermal conductors 96 and 100 respectively provided along the anode contact 94 and cathode contact 98 of the cell 90. The electrochemical cell 90 is illustrated as being constrained by substantially planar surfaces 92 disposed adjacent the thermal conductors 96, 100, such as the walls of a containment vessel. The thermal conductors 96, 100 are formed to include a substantially double C-shaped portion which permits the thermal conductors 96, 100 to collapse and expand in a spring-like manner.

Figure 6:
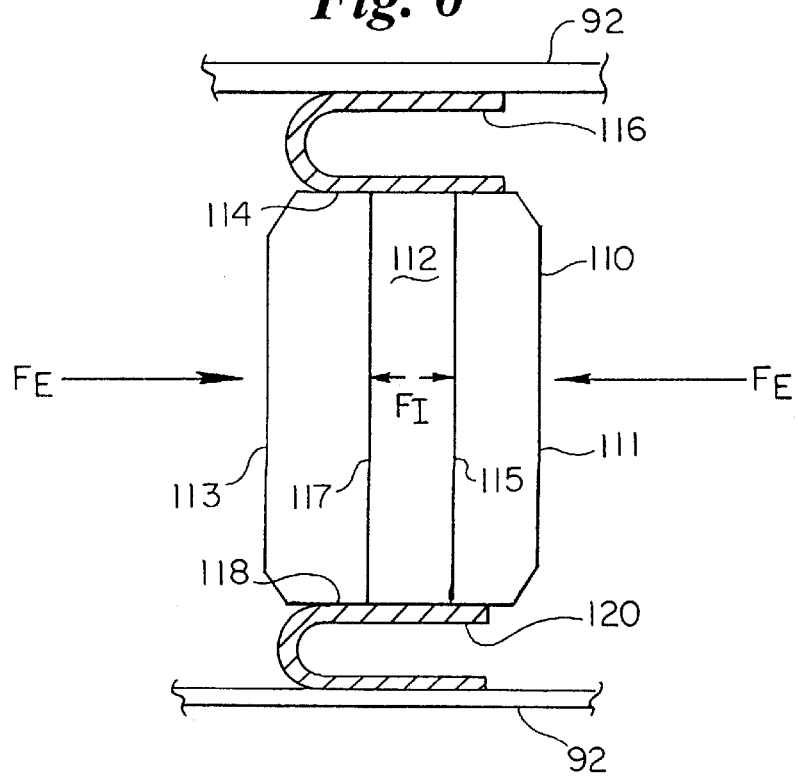
FIG. 6 illustrates an alternative embodiment of a thermal conductor configuration for an electrochemical cell constrained between substantially planer wall structures.

The thermal conductors 96, 100 shown in FIG. 5 are formed to provide a relatively high degree of dimensional take-up in order to accommodate assembly tolerances when installing the cell 90 between substantially rigid wall structures 92. The thermal conductors 96, 100 also exhibit a relatively high degree of spring-back to accommodate possible wall deflections and variations in the separation distance between the cell 90 and the wall structures 92 over time. Another embodiment of a thermal conductor well-suited for use with prismatic electrochemical cells is shown in FIGS. 6 and 7. These embodiments provide for the efficient transfer of current and thermal energy into and out of a prismatic electrochemical cell.

In FIG. 6, the electrochemical cell 110 includes substantially C-shaped thermal conductors 116, 120 which are respectively attached to the anode and cathode contacts 114, 118 of the cell 110. The C-shaped thermal conductors 116, 120 expand and compress to accommodate dimensional variations and positional shifting between the cell 110 and the walls 92 of a structure constraining the cell 110.

In general, a thermal conductor is formed to provide a relatively high degree of dimensional take-up in order to accommodate assembly tolerances when installing the electrochemical cell/conductor combination between substantially stationary support structures of a containment vessel. The thermal conductor 254 also exhibits a relatively high degree of spring-back to accommodate possible wall deflections and variations in the separation distance between the cell and an adjacent wall structure over time.

A thermal conductor that provides the above-described thermal, electrical, and mechanical advantages should be fabricated from a material which has a relatively high thermal and electrical conductivity. The material should have good surface characteristics for establishing contacts with both a separate planar support surface and an integral metallization layer formed on the anode or cathode contacts of the electrochemical cell. Further, the material used to fabricate the resilient portion of the thermal conductor should have a relatively low force of compression so as to avoid damaging the edges of the cell or the surface of the wall structures adjacent the cell. Also, the thermal conductor contacts should be configured to minimize the length of the thermal flux path, yet maximize the cross-sectional area in order to optimize the heat transfer characteristics of the thermal conductor contacts.

A suitable material for use in the fabrication of a thermal conductor having the above-described characteristics is pure copper, although other metals and alloys may be employed. It is understood that the thermal conductor described herein may be considered a two-part conductor apparatus constituted by a metallization layer disposed on the anode or cathode contact in combination with the spring portion of the conductor. Alternatively, the thermal conductor may be viewed as a single spring conductor that facilitates the conduction of both thermal and electrical energy to and from the electrochemical cell.

In yet another embodiment of a thermal conductor, and as best shown in FIG. 3D, the thermal conductor comprises a number of laterally offset anode and cathode film layers 73, 75 and the anode and cathode contacts 72, 74. In this embodiment, one or both of the anode and cathode contacts 72, 74 may directly engage the thermally conductive, electrically resistive material disposed on the wall of a containment vessel. The resilient portion of the thermal conductor constitutes the laterally offset anode and cathode film layer 73, 75 which flex in response to relative movement between the cell and the vessel wall.

Figures 7A, 7B, 7C, 7D:
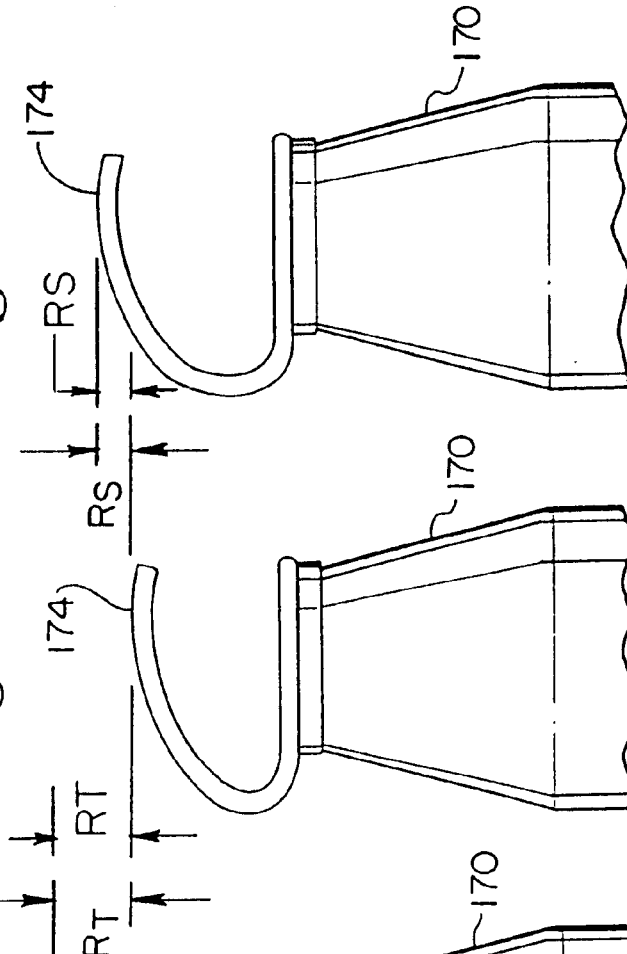
FIGS. 7A–7D illustrate another embodiment of a thermal conductor for use with an electrochemical cell.

The thermal conductor 174 illustrated in FIGS. 7A–7D is formed to include a substantially C-shaped portion which exhibits good dimensional take-up and spring-back properties. In FIG. 7A, the thermal conductor 174 is shown in a relaxed state prior to attachment to a contact 172 of an electrochemical cell 170. The relaxed state of the thermal conductor 174 aids in the process of attaching the thermal conductor 174 to the cell 170. After the thermal conductor 174 is attached to the cell contact 172, a wiping procedure is typically performed on the thermal conductor 174 to ensure that the thermal conductor 174 will collapse properly when installed in a compressed state between the walls of a constraining structure.

The pre-installation configuration of the thermal conductor 174 is shown in FIG. 7B. In FIG. 7C, the thermal conductor 174 is shown in a compressed state which would typically arise when the cell 170 is installed between the walls of a constraining structure. The take-up range, $R_T$, represents the total distance in which the thermal conductor 174 may be compressed without significantly reducing its spring-back properties. FIG. 7D illustrates the spring-back property of the thermal conductor 174 that would be implicated in response to relative movement between the cell 170 and the walls of a constraining structure abutting the thermal conductor 174. The magnitude of the spring-back displacement in this illustrative example is depicted as the dimension $R_S$.

The embodiment of a thermal conductor 174 shown in FIGS. 7A–7D provides for spring-back in the range of approximately 1–3 mm, which is sufficiently large to compensate for relative movement of approximately 1–3 mm between the electrochemical cell and an adjacent wall structure. It is noted that a thermal conductor having a substantially C-shaped cross-section and a nominal height value of approximately 3 mm varies in thermal conductance as a function of height variation resulting from changes in area of contact between the thermal conductor and the adjacent wall.

For example, it has been demonstrated that a height variation of ±0.5 mm results in a corresponding conductance change ranging between 450–575 W/m$^2$C. The conductance of a non-compressed thermal conductor having a nominal height of 3 mm, without introduction of a thermally conductive compound, is approximately 200 W/m$^2$C. Introducing a compliant thermal compound may improve the conductance characteristics of the thermal conductor during compression and extension of the conductor. The thermal conductor may include an elastomeric spring element which is retained within the thermal conductor. Use of an elastomeric spring element generally improves the spring-back characteristics of the thermal conductor, and may be fabricated using stock materials, such as cylindrical elastomeric tubing.

It is understood that a thermal conductor which exhibits the mechanical, thermal, and electrical characteristics described herein may be formed to include spring-like portions having configurations that differ from those illustrated in the figures. By way of example, a thermal conductor may be formed to include a spring mechanism having a substantially C-shaped, double C-shaped, Z-shaped, O-shaped, S-shaped, V-shaped, or finger-shaped cross-section, which permits the thermal conductor to expand and collapse to accommodate dimensional variations and positional shifting between the cell and the walls of a structure constraining the cell.

The volume of an electrochemical cell of the type described previously with regard to FIG. 1 varies during charge and discharge cycling due to the migration of lithium ions into and out of the lattice structure of the cathode material. This migration creates a corresponding increase and decrease in total cell volume on the order of approximately five to six percent or more during charging and discharging, respectively. It has been determined by the inventors that the performance and service-life of an electrochemical cell is significantly increased by maintaining the cell in a state of compression. Improved cell performance is realized by maintaining pressure on the two larger opposing surfaces of the cell. It is considered desirable that the compressive forces, whether produced internally or externally of the cell, be distributed fairly uniformly over the surface of application, and typically with no greater variation that approximately 10 psi over the applied surface.

In the embodiment illustrated in FIG. 5, for example, a cell 90 is shown as being constrained between substantially planar walls 92 of a containment vessel. The cell 90 includes two opposing surfaces 91, 93 each having a large surface area relative to the surface area of the four edges of the cell 90. An external force, $F_E$, is applied to the opposing surfaces 91, 93 so as to maintain the cell 90 in a state of compression. The magnitude of the external force, $F_E$, typically ranges between approximately 5 psi to 100 psi during charge/discharge cycling. It is understood that the external force, $F_E$, may be maintained at a constant magnitude, such as 20 psi for example, or may vary between a minimum and a maximum value, such as between approximately 5 and 100 psi. Further, the external force, $F_E$, may be produced by contact between one surface 91 of the cell 90 and an active force generation mechanism, while the opposing surface 93 is restricted from movement by a stationary structure. Alternatively, an active force generating mechanism may be applied to both opposing surfaces 91, 93 of the electrochemical cell 90.

Referring to the embodiment illustrated in FIG. 6, an electrochemical cell 110 may be configured to include a central core element 112 which produces a compressive force, $F_I$, internal to the cell 110. The core element 112, which may include a foam or other type of spring mechanism, exerts a compressive force, $F_I$, along internal surfaces 115, 117 of the cell 110. Counteracting external forces, $F_E$, produced along the exterior surfaces 111, 113 of the cell 110 result in the generation of compressive forces distributed fairly evenly across the external surfaces 111, 113 and internal surfaces 115, 117 of the cell 110.

It is noted that the externally produced force, $F_E$, exerted on the exterior surfaces 111, 113 of the cell 110 may be produced by a stationary structure, such as a wall of a containment vessel, or through use of an active force generating mechanism, such as a flat foam element or a flat spring-type apparatus. A force generating apparatus 112 employed within the cell 110 should maintain an evenly distributed pressure along the inner surfaces 115, 117 of the cell 110. This force, $F_I$, may be maintained at a constant magnitude or varied over a range of pressure values.

Figure 8A:
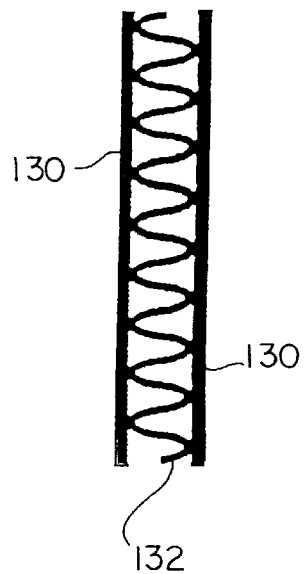
FIGS. 8A–8D illustrate various embodiments of a spring-type element for use within or adjacent to a prismatic electrochemical cell.

In FIGS. 8A–8D there is illustrated in cross-section various embodiments of a spring element which may be employed to produce internal or external compressive forces exerted on an electrochemical cell. In one embodiment, a thin-film electrochemical cell, such as that illustrated in FIG. 1, may be wound about a core element 130 which includes a flexible metal member 132 constrained between two thin metal plates 130, as is shown in FIG. 8A. The use of a metal core element 130 provides for consistency in shape and performance over time, since such a structure is substantially immune to mechanical creep.

Figure 8B:
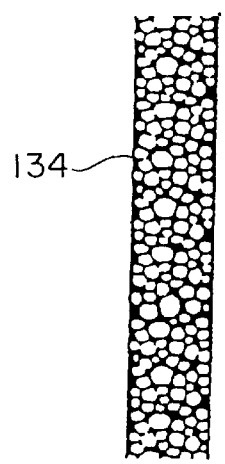

Use of an elastomeric element within or adjacent a cell, in accordance with another embodiment, offers advantages of simplicity in fabrication, efficiency in cell packaging configuration, improved pressure distribution, and relatively low material costs. An elastomeric foam spring 134, such as that illustrated in FIG. 8B, provides for a relatively large deflection as a percentage of the spring's original size, which provides for volume and weight conservation. A foam core element 134 is initially maintained at approximately 10 to 40 percent compression with respect to its original thickness prior to winding the thin-film cell material about the core element 134 during cell fabrication. This initial state of compression produces compressive pressure within the cell that typically ranges between approximately 10 and 35 psi during volumetric variations in the cell resulting from charge/discharge cycling.

Figure 8C:
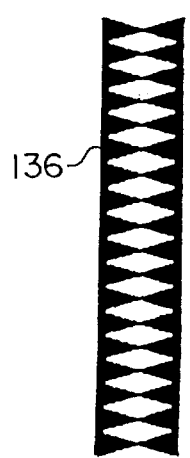
Figure 8D:
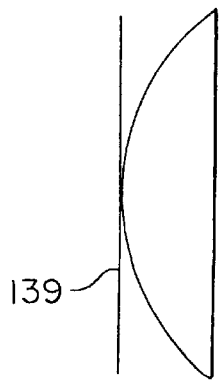

In accordance with the embodiment illustrated FIG. 8C, a micro-structured or molded elastomeric extrusion 136 may be employed within or adjacent to an electrochemical cell which may provide enhanced control of forces produced within the electrochemical cell. A leaf spring mechanism, such as that shown in FIG. 8D, may also be employed to generate the requisite compressive force, either internal to or external of the cell. It is understood that other internal and external force producing mechanisms may be employed to maintain the electrochemical cell in a state of compression during charge and discharge cycling.

For example, a metallic or elastic band or set of bands may be utilized in combination with end plates situated adjacent the exterior surfaces of the electrochemical cell. The band or combination of bands may be employed to produce a force that pulls the plates together, thereby producing the requisite compressive forces for the cell. Various types of leaf spring mechanisms, including or exclusive of pressure banding may also be employed. By way of further example, the spring elements shown in FIGS. 8A–8D may be configured as a flat spring which may be disposed adjacent to or between an electrochemical cell and a stationary wall structure.

Figure 9:
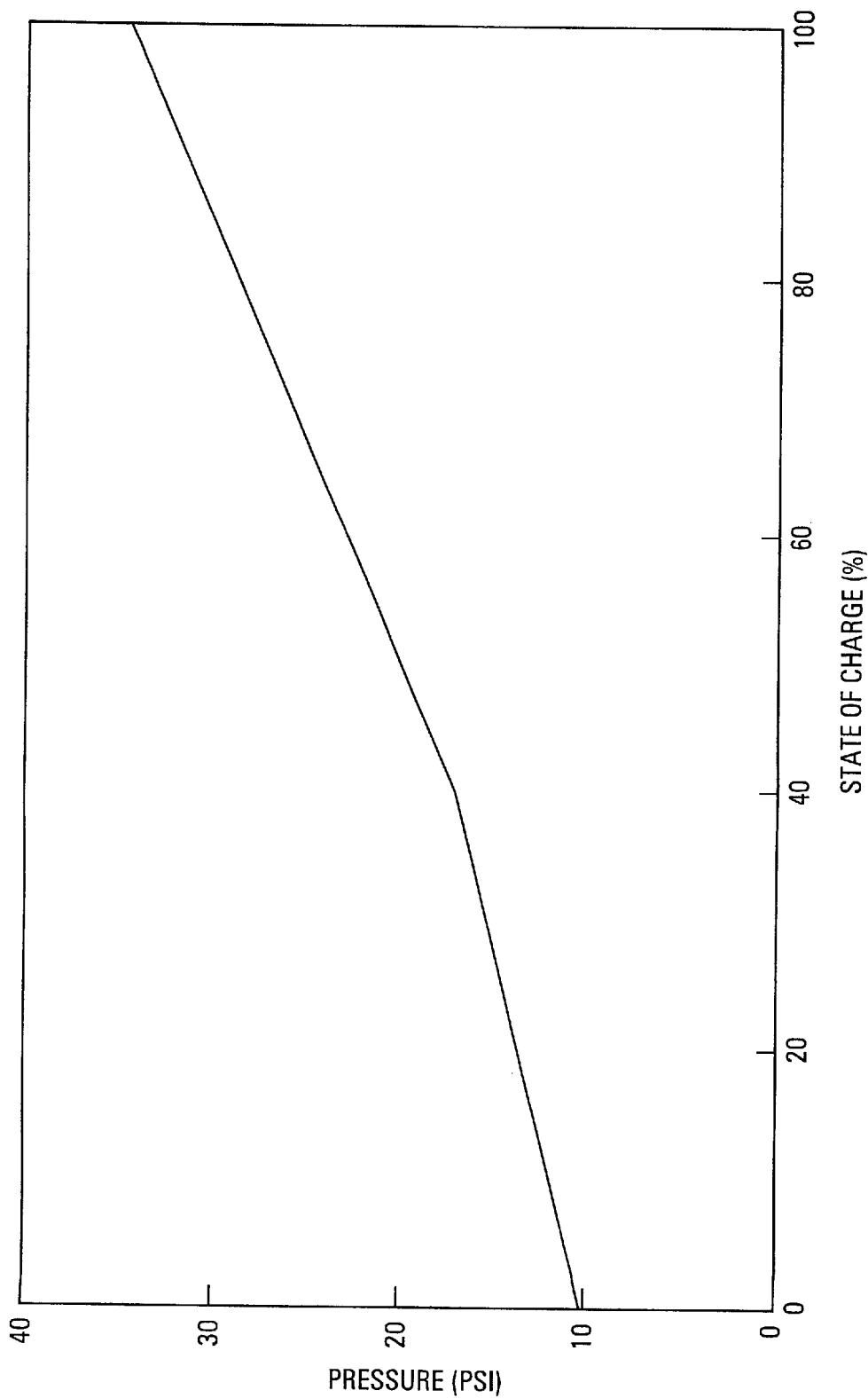
FIGS. 9–10 illustrate in graphical form a relationship between internal electrochemical cell pressure as a function of the state of charge and percent compression of the cell, respectively.
Figure 10:
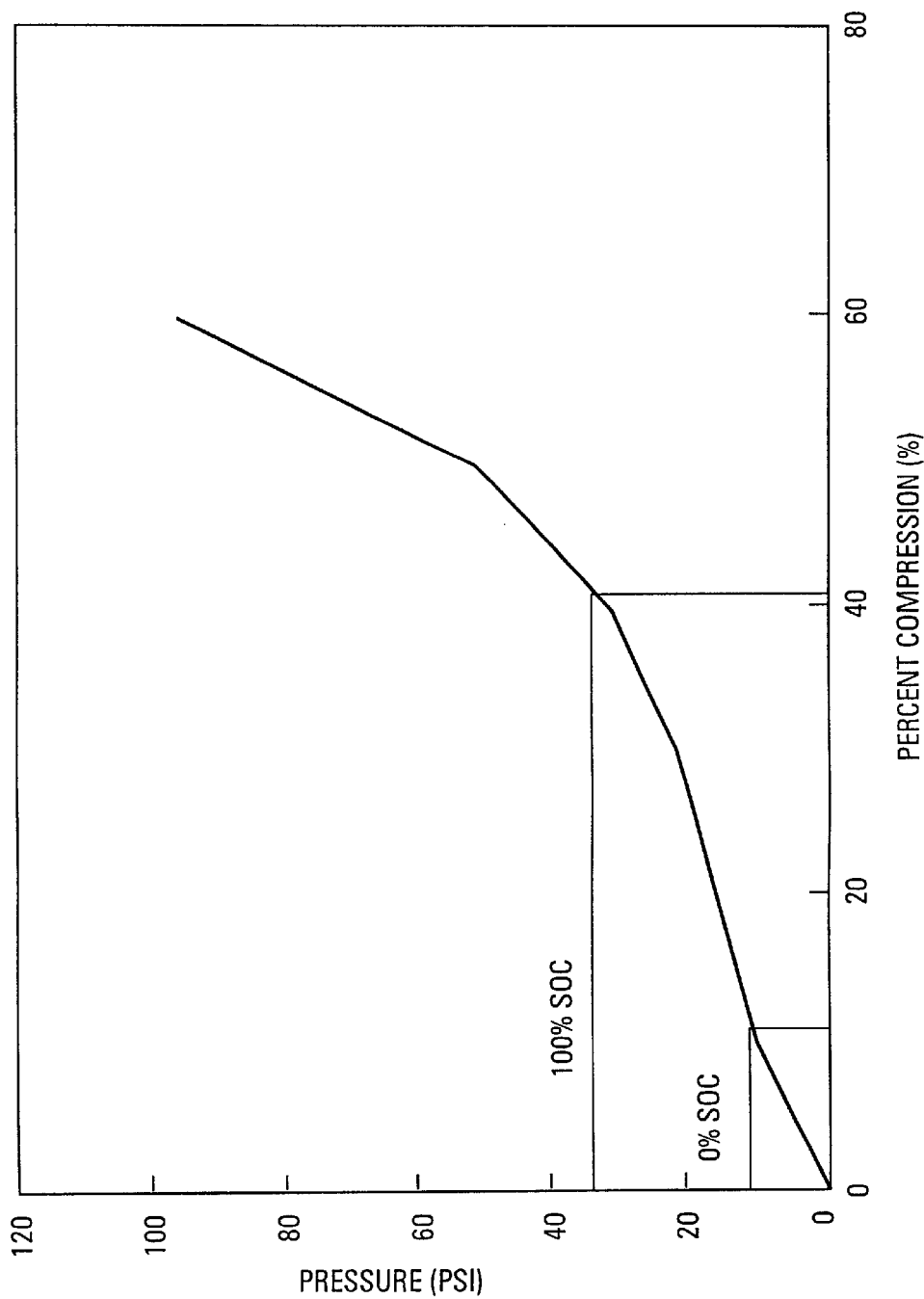

In FIGS. 9 and 10, there is illustrated a graph showing a relationship between the state of charge (SOC) of an electrochemical cell having a silicone foam core element and the percent compression of the foam core element as a function of pressure. The data characterized in graphical form in FIGS. 9 and 10 were obtained using a silicone foam element, having a thickness of approximately 0.8 mm, inserted in the core of a thin-film electrochemical cell. The overall thickness of the electrochemical cell including the foam insert is 5.86 mm, irrespective of the state of the cell. The graph of FIG. 10 demonstrates that the foam core element is subject to between approximately 10 to 40 percent compression with respect to its original thickness as the state of charge of the cell is varied between 0% and 100%, respectively. The foam core element produces corresponding internal compressive forces varying between approximately 10 to 35 psi.

Turning now to FIG. 11, there is illustrated an alternative embodiment of a force generating mechanism for maintaining an electrochemical cell in a state of compression. In accordance with this embodiment, an electrochemical cell 142 is disposed in a housing 140. A leaf spring apparatus 144 may be disposed on one or both side surfaces of the cell 142 to produce the requisite compressive force, $F_E$. The leaf spring apparatus 144 includes a thrust plate 150 having a surface area substantially equivalent to that of the large side surface 141 of the cell 142. A leaf spring 146, which may constitute a single or multiple nested spring, is connected to the thrust plate 150 and an inner wall 148 of the casing 140. The material used in construction of the leaf spring 146 may be selected to produce the requisite level of external force, $F_E$, so as to maintain the cell 142 in a continuous state of compression during charge/discharge cycling. It is appreciated that various arrangements of multiple leaf spring mechanisms may be employed, such as tandem, back-to-back, or other configurations.

Figure 13:
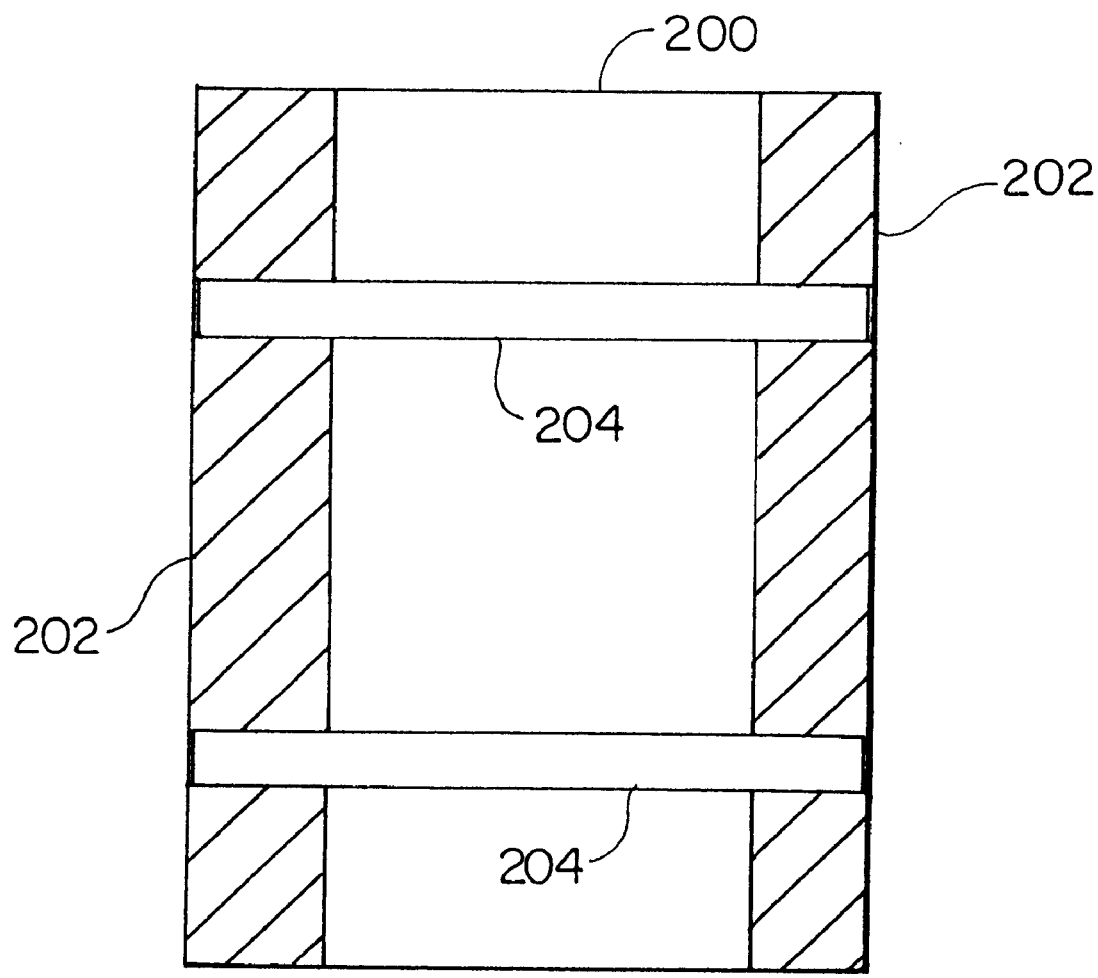
FIG. 13 is a cross-sectional illustration of another embodiment of a force generating apparatus for maintaining an electrochemical cell in a state of compression.

In the embodiment shown in FIG. 13, a thrust plate 202 is situated adjacent opposing side surfaces of the cell 200. One or more bands 204 are attached to the thrust plates 202 and exert a force that tends to pull plates 202 together, thereby placing the cell 200 in compression. The bands 204 may be fabricated from elastomeric material or other elastic material. Alternatively, the bands 204 may include a metal spring or be fabricated from a metal strap having a series of wave-like bends integrally impressed therein.

In FIG. 12, there is shown a side cross-sectional view of an electrochemical cell 180 including a thermal conductor 182 having a configuration similar to the thermal conductor 152 illustrated in FIG. 11. The embodiment shown in FIG. 12 exploits the previously described electrical, thermal, and mechanical attributes of the thermal conductor 182 when the cell 180 is situated in a containment vessel having thermally conductive, electrically resistive material 184 disposed adjacent the thermal conductor 182. In accordance with this configuration, the thermal conductor 182 conducts current into and out of the electrochemical cell 180, and includes a lead portion 186 which provides for convenient connectivity to an external energy consuming element and to a charging unit.

Current is conducted along the low electrical resistivity path defined by the thermal conductor 182 and the lead 186 in preference to the high electrical resistivity path defined by the thermal conductor 182 and the material 184 adjacent the wall 188 of the containment vessel. The thermal conductor 182 further provides a thermal flux path through which thermal energy is efficiently transferred between the cell 180 and the wall 188 of the containment vessel coated with a thermally conductive material 184.

In one embodiment, the thermally conductive material 184 may constitute an anodized aluminum coating developed on the surface of an aluminum casing or other structure 188. The thermally conductive coating 184, which may alternatively constitute a compliant thermal compound or material, typically exhibits good electrical resistivity and good thermal conductance characteristics. In the case of a stainless steel housing, a thin sheet of plastic or mineral-based material, such as mica, may be disposed adjacent the housing wall. As such, thermal energy produced by, or introduced into, the cell 180 is efficiently transferred between the thermally conductive material 184, the thermal conductor 182, and the cell 180, while current is conducted preferentially along the metal-sprayed contact thermal conductor 182 and lead 186.

Depending on the intended service environment, an electrochemical generator of the type described herein may be disposed within a hermetically sealed housing, it being understood that hermetic sealing is not necessary for the safe and proper operation of the electrochemical generator. The sealing apparatuses illustrated in FIGS. 14–18 may be employed to provide hermetically sealed feed-throughs for gaining access to the interior of a sealed electrochemical generator housing.

Figure 14:
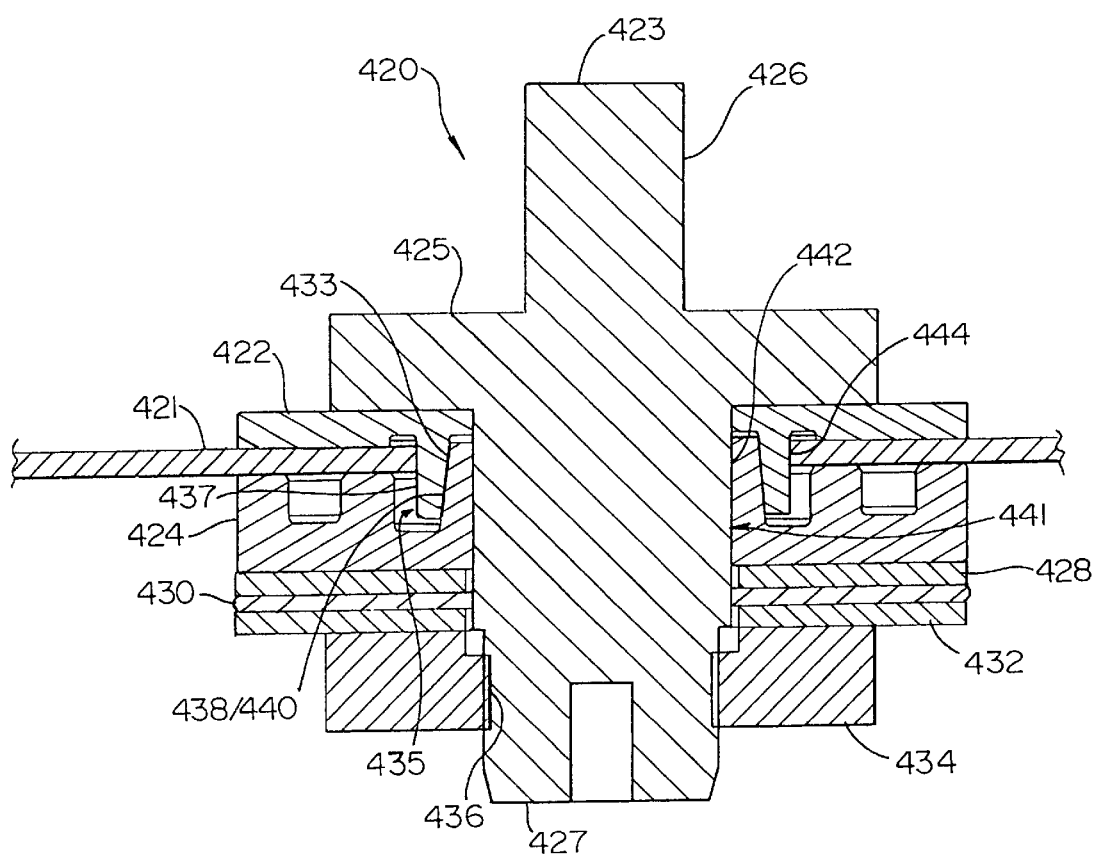
FIG. 14 is a depiction of an embodiment of a hermetic sealing apparatus for sealing a passage provided in a cover of an electrochemical generator housing.
Figure 15:
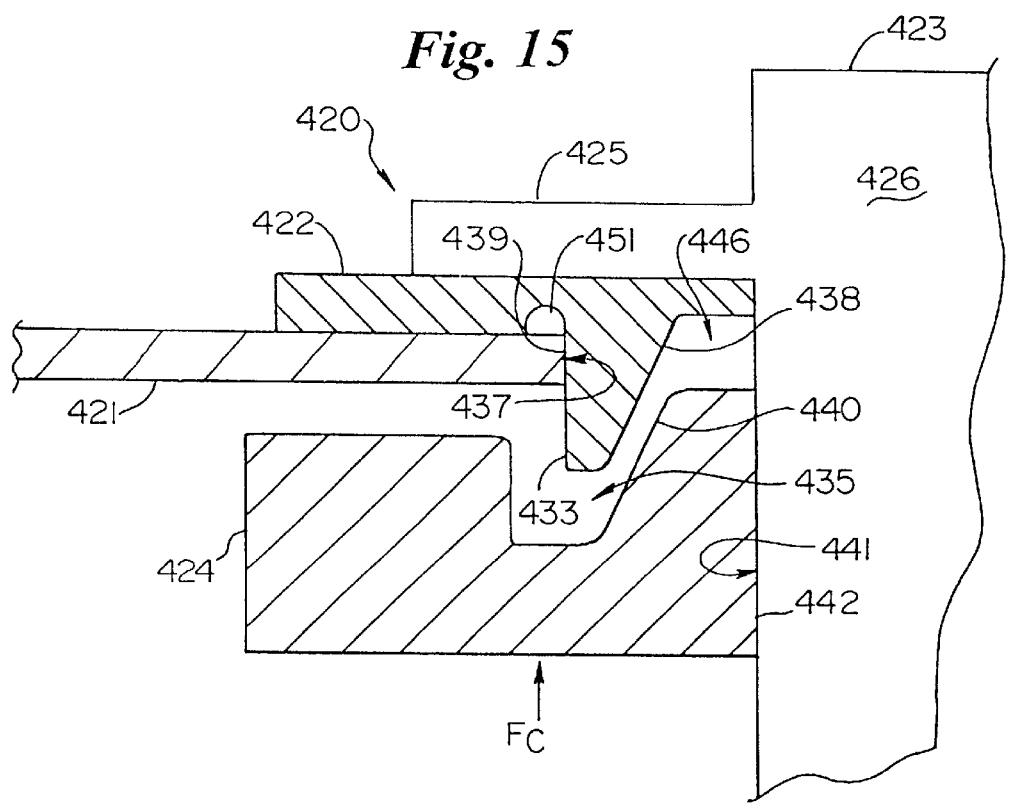
FIGS. 15–16 illustrate a pre-sealed configuration and a post-sealed configuration of the hermetic sealing apparatus shown in FIG. 14, respectively.
Figure 16:
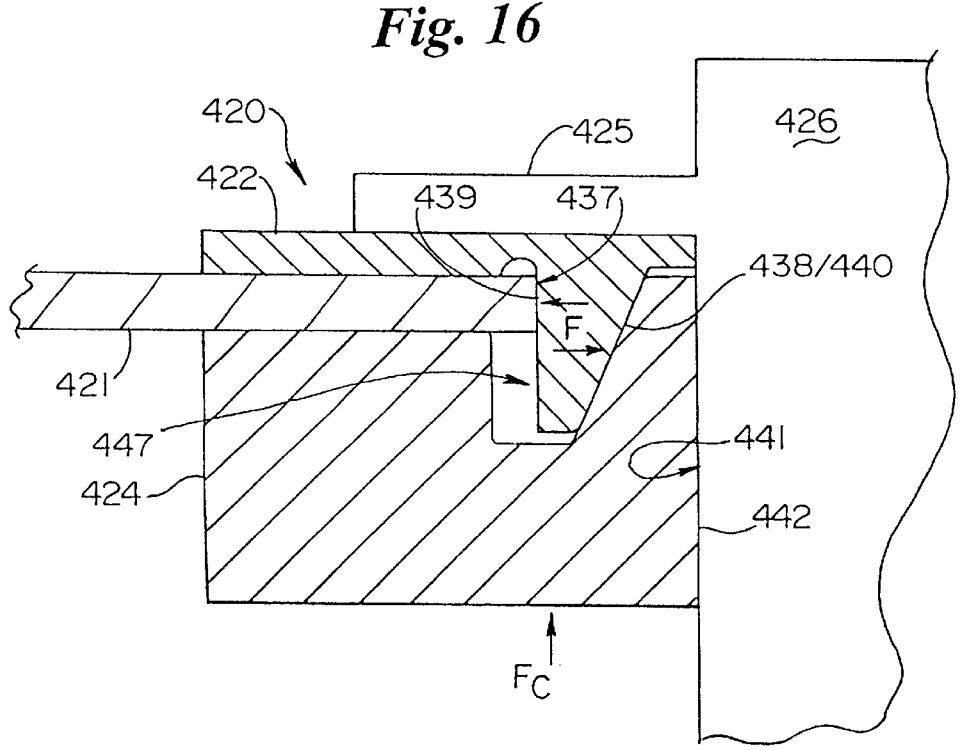

Referring now to FIGS. 14–16, there is illustrated a hermetic seal apparatus in accordance with an embodiment of the present invention. A seal of this type may be employed to provide hermetic sealing between a conduit, such as an electrical feed-through provided in a housing cover of an electrochemical generator, and a passage in the housing. Power lines, for example, may be passed through the conduit to provide external connectivity with components contained within the hermetic environment of an encased generator.

The hermetic seal 420 shown in FIGS. 14–16 includes a first seal body 422 having a central passage which is in general alignment with a hole provided through a substantially planar plate 421, such as a cover or wall of a housing. A second seal body 424 of the seal 420 also includes a central passage which is in general alignment with the hole of the cover 421 and the central passage of the first seal body 422. The first seal body 422 is disposed on an upper surface of the cover 421, and the second seal body 424 is disposed on a lower surface of the cover 421.

In one embodiment, the first seal body 422 includes a collar 433 which extends through the hole of the cover 421 and bears against an inner surface 439 of the hole. The collar 433 includes a tapered inner surface 438 which tapers away from the central passage of the first seal body 422. The second seal body 424 includes a groove 435 having an inner tapered surface 440 which tapers toward the central passage of the second seal body 424.

As is best illustrated in the pre-sealed and post-sealed depictions provided in FIGS. 15 and 16, respectively, the collar 433 of the first seal body 422 is received by the groove 435 provided in the second seal body 424 such that the tapered surfaces 438, 440 of the first and second seal bodies 422, 424 slidably engage one another as the collar 433 is forced into the groove 435. Engagement of the opposing tapered surfaces 438, 440 of the first and second seal bodies 422, 424 in a fully installed configuration forces a portion 437 of the outer surface of the collar 433 to cold flow against the inner surface 439 of the hole provided in the cover 421. Those skilled in the art will appreciate that cold flowing one material against another material forms an extremely tight seal between the two materials. As such, a hermetic seal is provided between the inner surface 439 of the hole and the collar 433 through slidable engagement between the collar 433 of the first seal body 422 and the groove 435 provided in the second seal body 424.

As is further shown in FIGS. 14–16, a conduit 426, having a first end 423 and an opposing second end 427, passes through the hole in the cover 421 and the central passages of the first and second seal bodies 422, 424. The conduit 426 includes a central passage through which electrical and communication lines may pass into the internal hermetic environment of an electrochemical generator housing to which the cover 421 is mounted. The conduit 426 includes a flange 425 which extends outwardly from the first end 423 of the conduit 426 and contacts a surface of the first seal body 422. The conduit 426 has a diameter which is substantially equivalent to the diameter of the central passages of the first and second seal bodies 422, 424, such that an outer surface 442 of the conduit 426 forms a tight, smooth fit with the inner diameter surfaces of the first and second seal body central passages.

A portion of the second end 427 of the conduit 426 is threaded so that a nut 434 may be secured thereon. The seal 420 also includes a thrust washer 428 that abuts a lower surface of the second seal body 424. A wave washer 430 is disposed between the thrust washer 428 and a second thrust washer 432. A nut 434, in abutment with the second thrust washer 432, exerts an axially directed compressive force on the elements of the hermetic seal 420 as the nut 434 is tightened on the threaded second end 427 of the conduit 426.

As is best seen in FIG. 16, a compressive force, $F_C$, produced by the tightened nut 434 causes the wave washer 430 to compress which, in turn, forces the inwardly tapered inner surface 440 of the second seal body 424 into slidable engagement with the outwardly tapered inner surface 438 of the first seal body 422. Application of the compressive force, $F_C$, drives the inner diameter surface 431 of the second seal body 424 inwardly against the outer surface 442 of the conduit 426. Slidable engagement between the two tapered surfaces 438, 440 also drives a portion 437 of the collar 433 into tight engagement with the inner surface 439 of the hole provided in the cover 421. After tightening the nut 434 to generate an appropriate level of compressive force, $F_C$, the wave washer 430 continues to apply the compressive force, $F_C$, so as to maintain the integrity of the hermetic seal 420 over the service life of the seal. A spring-loaded metal keeper may be used as an alternative to the threaded nut 434. Other retention devices which are capable of maintaining a continuous compressive force, $F_C$, may also be employed.

In one embodiment, the cover 421 is constructed from a metallic material, such as aluminum, and the first and second seal bodies 422, 424 are fabricated from a plastic material, such as polypropylene plastic. The conduit 426 may be fabricated from a metallic or a plastic material. It is noted that gaps 446, 447 may be provided in the first and second seal bodies 422, 424, respectively, to accommodate positional shifting between the first and second seal bodies 422, 424 occurring from forced engagement of the two tapered surfaces 438, 440. Also, a notch 451 may be provided in the first seal body 422 to facilitate movement of the collar 433 in a direction toward the inner surface of the hole of the cover 421 in response to slidable engagement between the two tapered surfaces 438, 440.

Figure 17:
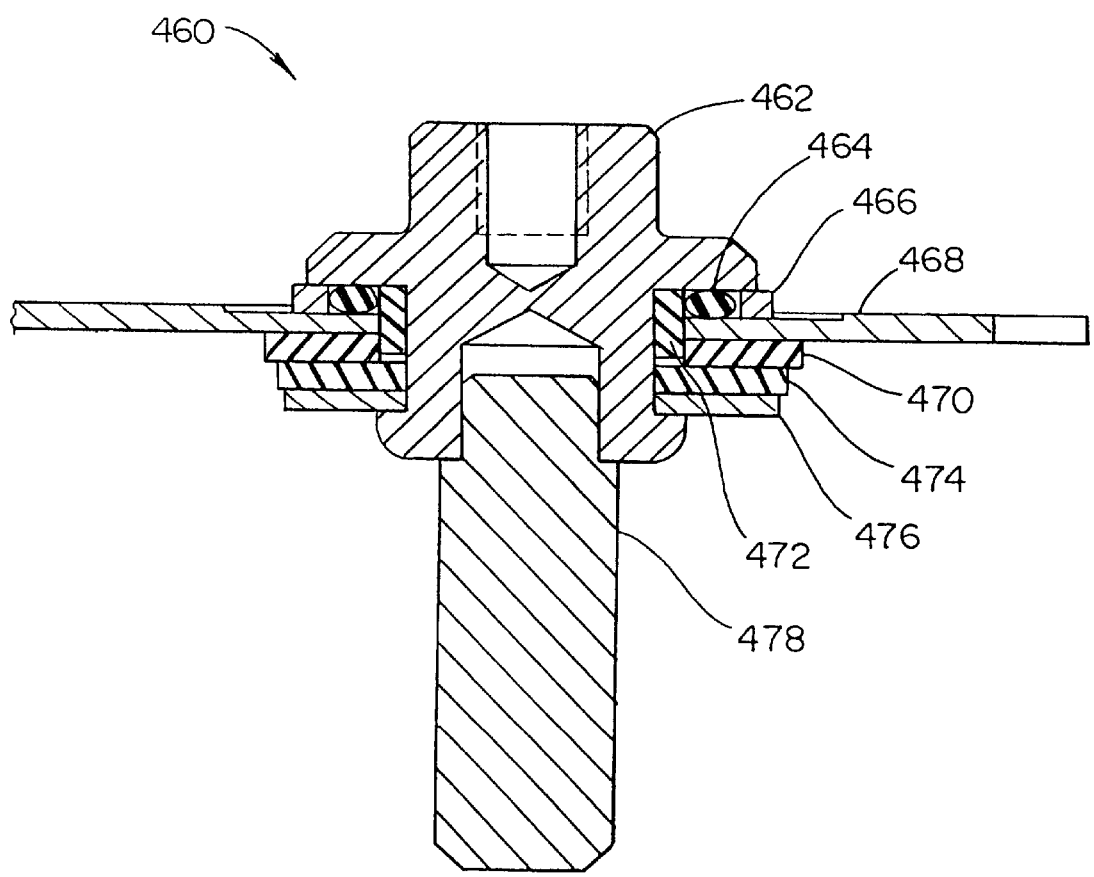
FIGS. 17–18 illustrate another embodiment of a hermetic sealing apparatus for sealing a passage provided in a cover of an electrochemical generator housing.
Figure 18:
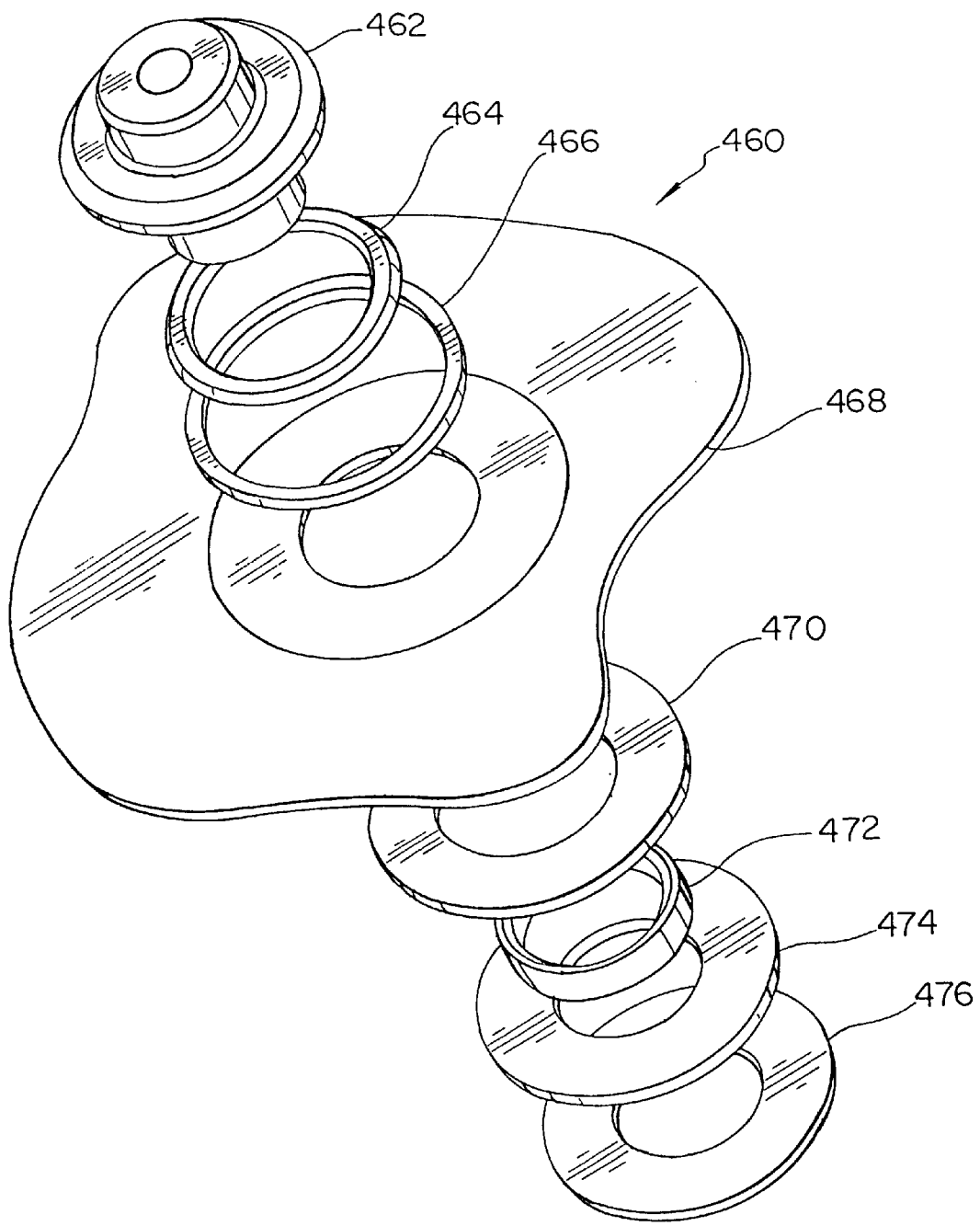

An alternative hermetic feed-through apparatus is shown in FIGS. 17–18. In accordance with this embodiment, hermetic sealing is provided primarily by an o-ring 464 which is compressed between a flanged conductor or terminal 462 and a wall or cover 468 of the electrochemical generator housing. A phenolic support 466 keeps the flanged conductor 462 at a constant distance from the cover 468, thus creating a cavity whose dimensions are stable over time. This arrangement prevents flowing of the o-ring material with time and high temperature.

A polypropylene ring 470 and sleeve 472 electrically insulate the bottom portion of the feed-through from the cover 468. In contrast to the phenolic ring material, polypropylene maintains its high dielectric strength even after being subjected to arcing. It is noted that arcing typically occurs, if at all, between the o-ring 464 and the polypropylene sleeve 472. Another advantage of using polypropylene material for the ring 470 and sleeve 472 material is that it provides a coefficient of friction that is sufficient to prevent the assembly from turning when subjected to the torque generated when wires are connected to the flanged conductors 462. The Belleville spring 474 is flattened when the feed-through is crimped. The Belleville spring 474 ensures that the assembly will be kept under pressure even if the polypropylene flows over time. The metal washer 476 helps to distribute pressure evenly across the surface of the polypropylene ring 470.

In general, the above-described hermetic sealing apparatuses exhibit a high dielectric strength between the housing cover or wall and a power conductor passing through the cover. Power terminal voltages on the order of 2,000 V can be accommodated without occurrences of arcing. Tight sealing (e.g., $10^{-8}$ cc-atm/sec) is maintained even when subjected to mechanical stresses. The hermetic seals also exhibit good torque resistance and good overall mechanical resistance.

It will, of course, be understood that various modifications and additions can be made to the various embodiments discussed herein above without departing from the scope or spirit of the present invention. By way of example, a thin elastomeric coating may be provided on the surface of various layers of a thin-film cell prior to winding, rolling, or otherwise forming of the electrochemical generator for purposes of producing the requisite internal compressive forces within the cell. By way of further example, the principles of the present invention may be employed in battery technologies other than those exploiting lithium polymer electrolytes, such as those employing nickel metal hydride (Ni-MH), lithium-ion, (Li-Ion), and other high energy battery technologies. Also, a gas charged element may be employed as a spring member and incorporated into the core element of an electrochemical cell or a separate flat spring structure external to the cell. Belleville and wave spring devices may also be used. Accordingly, the scope of the present invention should not be limited by the particular embodiments discussed above, but should be defined only by the claims set forth below and equivalents thereof.

What we claim is:

1. An electrochemical generator, comprising:
    a thin-film electrochemical cell maintained in a state of compression, the electrochemical cell subject to volumetric changes during charge and discharge cycling of the electrochemical cell; and
    a conductor, defining one of a positive or a negative contact for the electrochemical cell, which conducts current into and out of the electrochemical cell and conducts thermal energy between the electrochemical cell and thermally conductive and electrically resistive material disposed adjacent the conductor.

2. The electrochemical generator of claim 1, wherein a pressure apparatus external to the electrochemical cell maintains the electrochemical cell in the state of compression.

3. The electrochemical generator of claim 1, wherein a pressure apparatus internal to the electrochemical cell maintains the electrochemical cell in the state of compression.

4. The electrochemical generator of claim 1, wherein the electrochemical cell comprises one of a foam element or a metal spring element to maintain the electrochemical cell in the state of compression.

5. The electrochemical generator of claim 1, further comprising:
    a first plate and a second plate disposed adjacent opposing side surfaces of the electrochemical cell, respectively; and
    a spring member engaging one or both of the first and second plates for producing a force so as to maintain the electrochemical cell in the state of compression.

6. The electrochemical generator of claim 1, wherein the conductor comprises an integral spring.

7. The electrochemical generator of claim 1, wherein the conductor comprises a spring mechanism having one of a substantially C-shaped, double C-shaped, Z-shaped, V-shaped, O-shaped, L-shaped or finger-shaped cross-section.

8. An electrochemical generator, comprising:
    an enclosure including a first stationary structure and a second stationary structure;
    a thermally conductive and electrically resistive material disposed on the first stationary structure;
    a thin-film electrochemical cell, including a spring conductor defining one of a positive or a negative contact for the electrochemical cell, disposed between the first and second stationary structures, the spring conductor defining a current flux path for conducting current between the electrochemical cell and a contact external to the electrochemical cell, and defining a thermal flux path for conducting thermal energy between the electrochemical cell and the thermally conductive and electrically resistive material disposed on the first stationary structure; and
    a pressure apparatus that maintains the electrochemical cell in a state of compression, the electrochemical cell subject to volumetric changes during charge and discharge cycling of the electrochemical cell.

9. The electrochemical generator of claim 8, wherein the spring conductor maintains substantially continuous mechanical engagement with the thermally conductive and electrically resistive material disposed on the first stationary structure in response to relative displacement between the electrochemical cell and the first stationary structure.

10. The electrochemical generator of claim 8, wherein the spring conductor expands and contracts to accommodate variations in a separation distance between the electrochemical cell and the first stationary structure.

11. The electrochemical generator of claim 8, wherein the enclosure is a hermetically sealed enclosure.

12. The electrochemical generator of claim 8, further comprising one of an internal pressure apparatus or an external pressure apparatus, with respect to the electrochemical cell, that maintains the electrochemical cell in the state of compression.

13. The electrochemical generator of claim 8, wherein the electrochemical cell comprises one of a foam element or a metal spring element to maintain the electrochemical cell in the state of compression.

14. The electrochemical generator of claim 8, further comprising:
    a first plate and a second plate disposed adjacent opposing side surfaces of the electrochemical cell, respectively; and
    a spring member engaging one or both of the first and second plates for producing a force so as to maintain the electrochemical cell in the state of compression.

15. The electrochemical generator of claim 8, further comprising a pressure apparatus external to the electrochemical cell and engaging one of the first and second stationary structures that generates a force exerted on the electrochemical cell so as to maintain the electrochemical cell in the state of compression.

16. The electrochemical generator of claim 1, wherein the conductor is spot welded to a metalization layer provided along an edge of the electrochemical cell, the current being conducted laterally along the metalization layer.

17. The electrochemical generator of claim 1, wherein the electrochemical cell and the conductor are disposed in a hermetically sealed enclosure.

18. The electrochemical generator of claim 1, wherein the thermally conductive and electrically resistive material disposed adjacent the conductor comprises an electrically insulating material.

19. The electrochemical generator of claim 1, wherein the conductor comprises a flexible lead that attaches to an external connection for conducting current into and out of the electrochemical cell.

20. The electrochemical generator of claim 1, wherein the conductor comprises laterally offset anode or cathode current collecting films of the electrochemical cell.

21. The electrochemical generator of claim 8, wherein the spring conductor is spot welded to a metalization layer provided along an edge of the electrochemical cell, the current being conducted laterally along the metalization layer.

22. The electrochemical generator of claim 8, wherein the thermally conductive and electrically resistive material disposed on the first stationary structure comprises an electrically insulating material.

23. The electrochemical generator of claim 8, wherein the spring conductor comprises laterally offset anode or cathode current collecting films of the electrochemical cell.

\* \* \* \* \*

UNITED STATES PATENT AND TRADEMARK OFFICE
CERTIFICATE OF CORRECTION

PATENT NO. : 6,120,930 Page 1 of 1
DATED : September 19, 2000
INVENTOR(S) : Rouillard et al.

It is certified that error appears in the above-identified patent and that said Letters Patent is hereby corrected as shown below:

<u>Title page,</u>
Item [73], Assignees, replace "Corporation" with -- Company --;

Item [56], FOREIGN PATENT DOCUMENTS, replace "94 15 874" with
-- 94 15 874.6 --;

<u>Column 1,</u>
Line 20, replace "electromechanical" with -- electro-mechanical --.

Signed and Sealed this

Thirteenth Day of August, 2002

Attest:

Attesting Officer

JAMES E. ROGAN
*Director of the United States Patent and Trademark Office*